US012552675B2

(12) United States Patent
Chu

(10) Patent No.: US 12,552,675 B2
(45) Date of Patent: Feb. 17, 2026

(54) METHOD, APPARATUS, AND SYSTEM FOR PRODUCING SILICON-CONTAINING PRODUCT BY UTILIZING SILICON MUD BYPRODUCT OF CUTTING SILICON MATERIAL WITH DIAMOND WIRE

(71) Applicant: Xi Chu, Mounds View, MN (US)

(72) Inventor: Xi Chu, Mounds View, MN (US)

( * ) Notice: Subject to any disclaimer, the term of this patent is extended or adjusted under 35 U.S.C. 154(b) by 708 days.

(21) Appl. No.: 17/943,168

(22) Filed: Sep. 12, 2022

(65) Prior Publication Data

US 2023/0174382 A1 Jun. 8, 2023

Related U.S. Application Data

(63) Continuation of application No. 16/499,237, filed as application No. PCT/CN2018/080710 on Mar. 27, 2018, now Pat. No. 11,440,805.

(30) Foreign Application Priority Data

Mar. 27, 2017 (CN) .......................... 20170206493.8
May 5, 2017 (CN) .......................... 20170361112.3

(51) Int. Cl.
*C01B 33/18* (2006.01)
*B01J 8/18* (2006.01)
(Continued)

(52) U.S. Cl.
CPC ........... *C01B 33/182* (2013.01); *B01J 8/1836* (2013.01); *C01B 32/97* (2017.08); *C01B 33/023* (2013.01);
(Continued)

(58) Field of Classification Search
CPC ..... B01J 8/00; B01J 8/18; B01J 8/1836; B01J 2208/00; B01J 2208/00008;
(Continued)

(56) References Cited

U.S. PATENT DOCUMENTS 6,821,495 B2  11/2004  Fukuoka et al.
9,741,462 B2   8/2017  Jung et al.
(Continued)

FOREIGN PATENT DOCUMENTS

CN  103896283 A  7/2014
JP  S6256320 A   3/1987
(Continued)

*Primary Examiner* — Natasha E Young
(74) *Attorney, Agent, or Firm* — Charlotte C. Wilson

(57) ABSTRACT

The present application provides a method, a equipment and a system for producing a silicon-containing products by using a silicon sludge which is produced by a diamond wire cutting silicon material. The method of the present application mainly utilizes a high oxide layer on the surface of a silicon waste particle produced during diamond wire cutting. The characteristics are such that the surface oxide disproportionates with adjacent internal elemental silicon to form silicon monoxide to be removed in a vapor to achieve a physical chemical reaction with a metal, a halogen gas, a hydrogen halide gas or hydrogen to form a high value-added silicon-containing products. The process realizes the large-scale, high-efficiency, energy-saving, continuous and low-cost complete recycling of diamond-wire cutting silicon waste.

8 Claims, 9 Drawing Sheets

(51) Int. Cl.
*C01B 32/97* (2017.01)
*C01B 33/023* (2006.01)
*C01B 33/037* (2006.01)
*C23C 16/442* (2006.01)

(52) U.S. Cl.
CPC .......... *C01B 33/037* (2013.01); *C23C 16/442* (2013.01); *B01J 2208/0053* (2013.01)

(58) Field of Classification Search
CPC ..... B01J 2208/00017; B01J 2208/0053; C01B 32/97; C01B 32/00; C01B 32/90; C01B 32/914; C01B 32/956; C01B 32/963; C01B 33/00; C01B 33/02; C01B 33/021; C01B 33/023; C01B 33/037; C01B 33/08; C01B 33/10; C01B 33/107; C01B 33/1071; C01B 33/10715; C01B 33/10721; C01B 33/10726; C01B 33/10731; C01B 33/10736; C01B 33/113; C01B 33/12; C01B 33/18; C01B 33/181; C01B 33/182; C22B 7/00; C22B 7/001; C23C 16/00; C23C 16/44; C23C 16/442; Y02P 20/00; Y02P 20/10; Y02P 20/129
See application file for complete search history.

(56) References Cited

U.S. PATENT DOCUMENTS

| | | |
|---|---|---|
| 10,046,973 B2 | 8/2018 | Jung et al. |
| 11,440,805 B2 | 9/2022 | Chu |
| 2007/0259113 A1 | 11/2007 | Kizaki et al. |
| 2021/0309528 A1 | 10/2021 | Takeshita et al. |
| 2022/0259052 A1 | 8/2022 | Lee et al. |

FOREIGN PATENT DOCUMENTS

| | | |
|---|---|---|
| JP | S63103814 A | 5/1988 |
| JP | 2001220124 A | 8/2001 |
| JP | 5954492 B2 | 7/2016 |

(a)
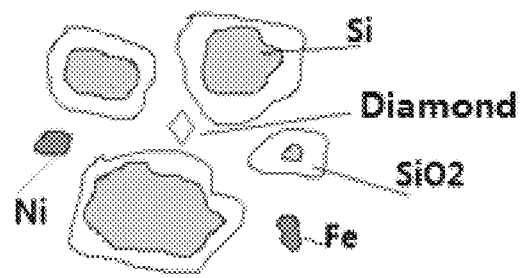
— FIG. 1A —
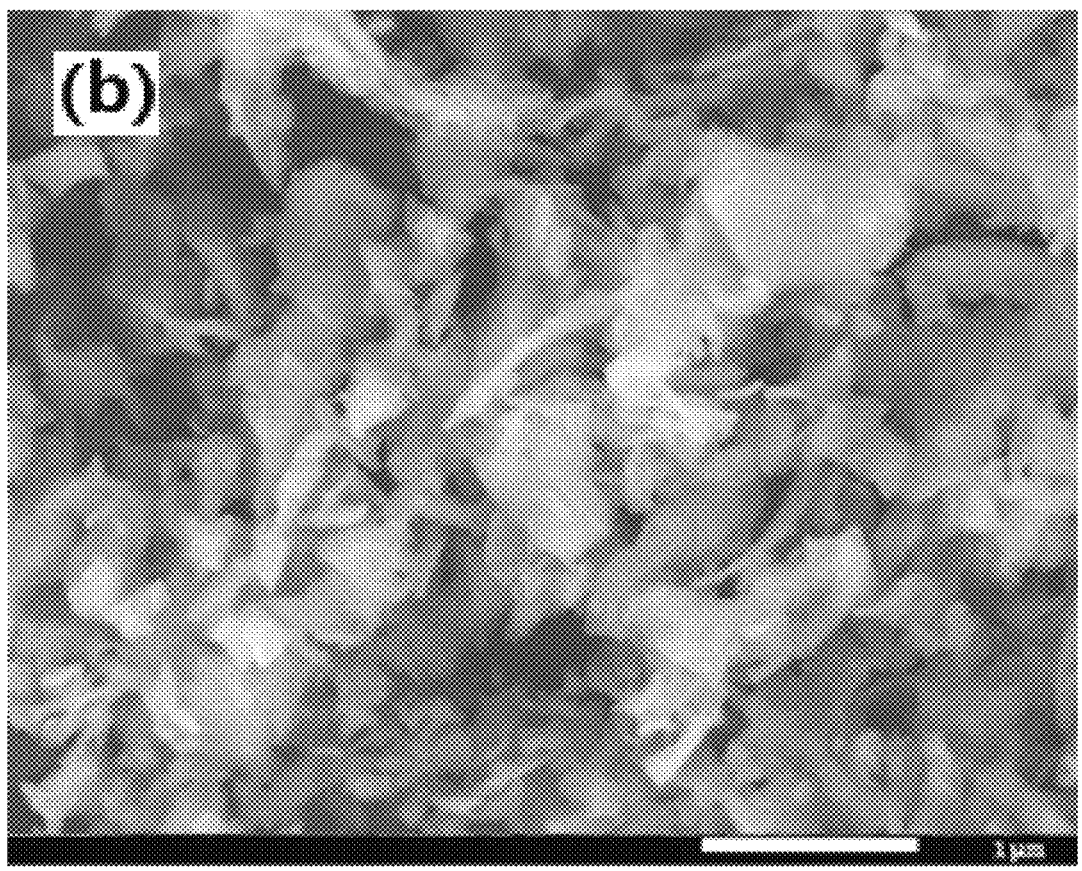
— FIG. 1B —

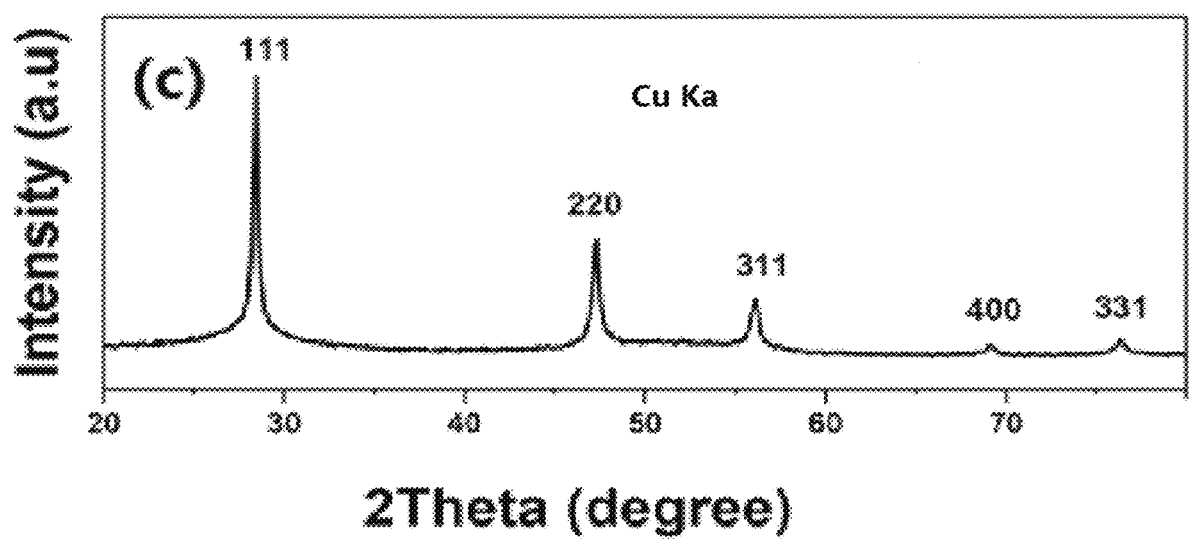
— FIG. 1C —

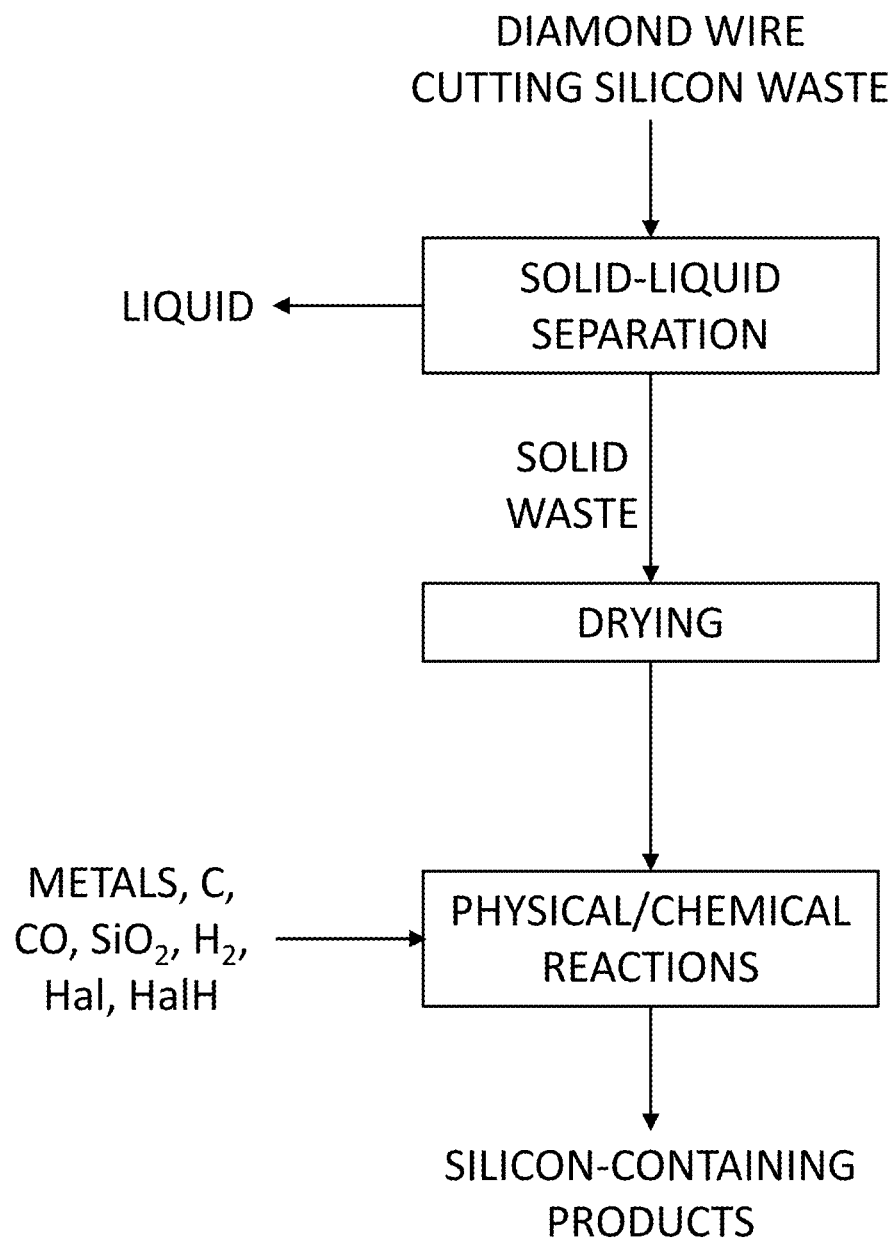
— FIG. 2A —

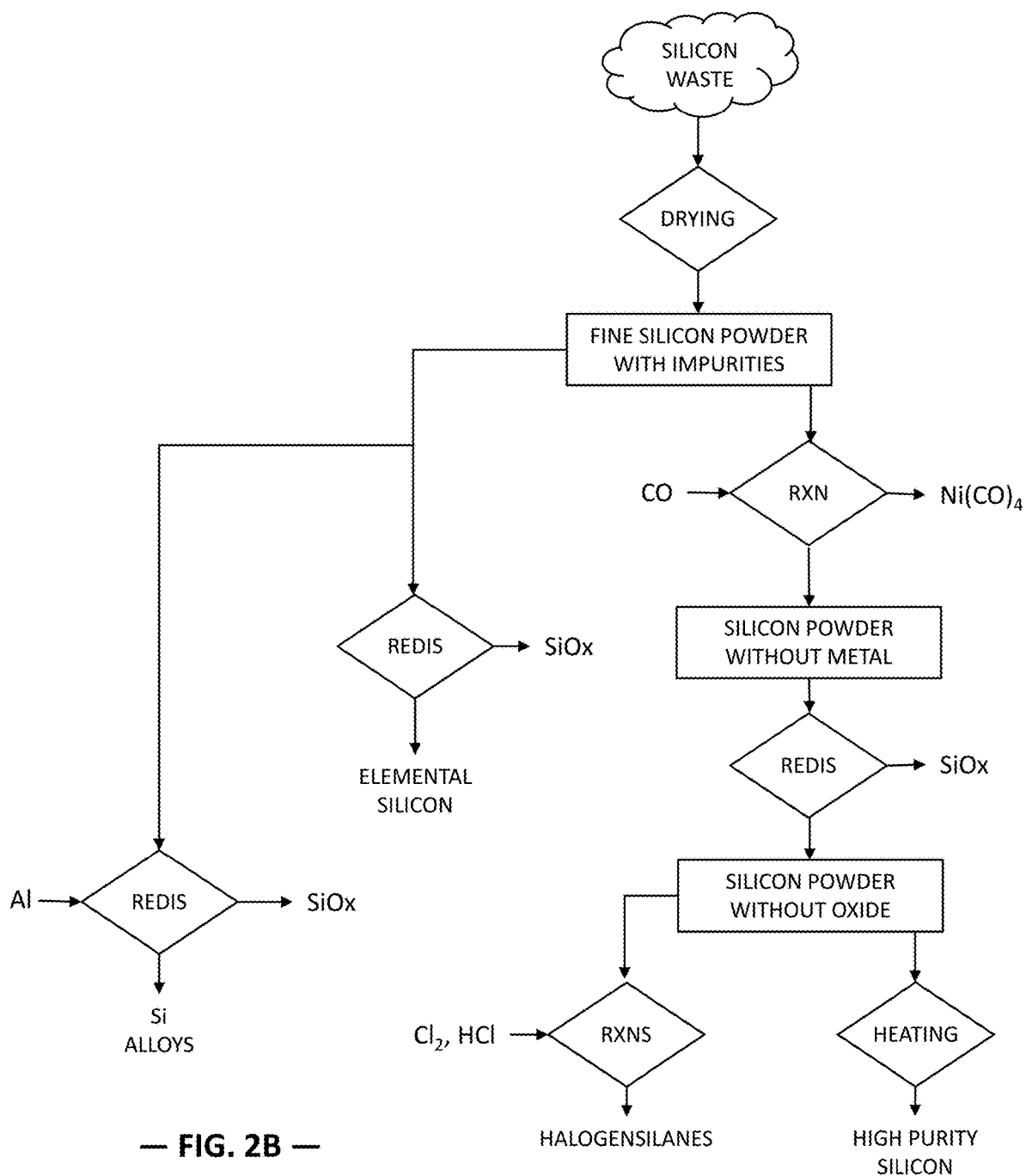
— FIG. 2B —

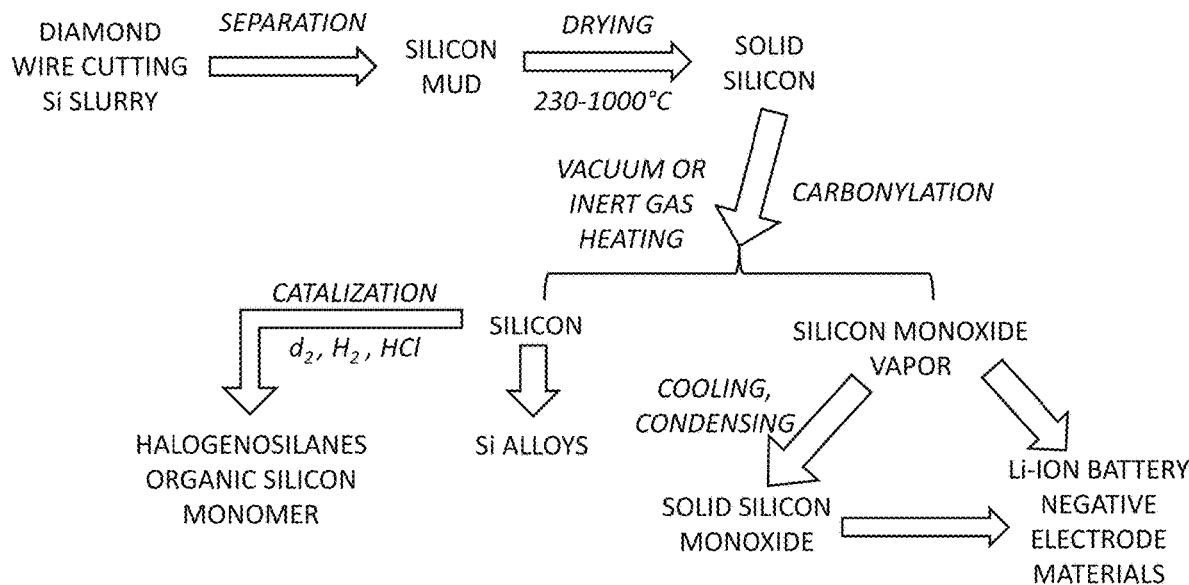
— FIG. 2C —
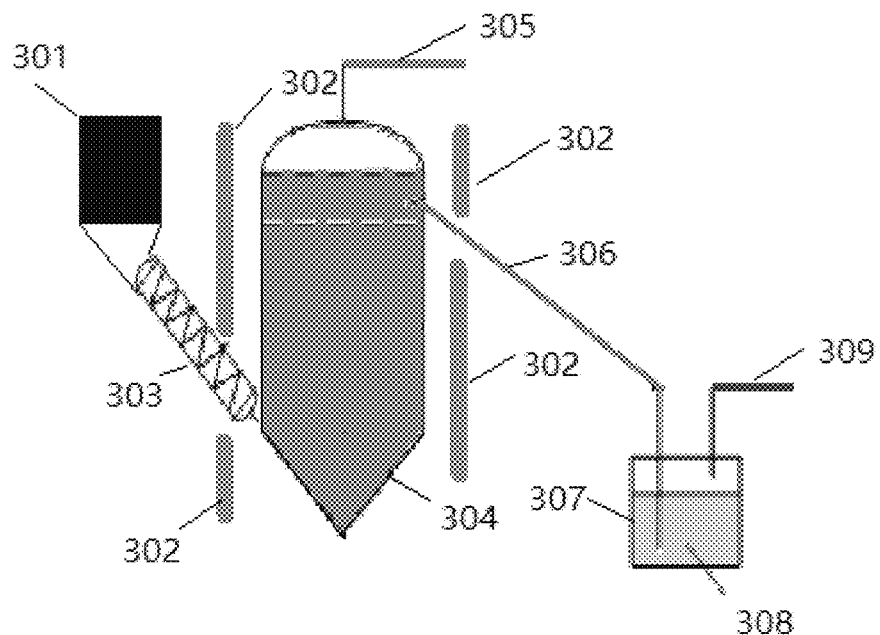
— FIG. 3 —

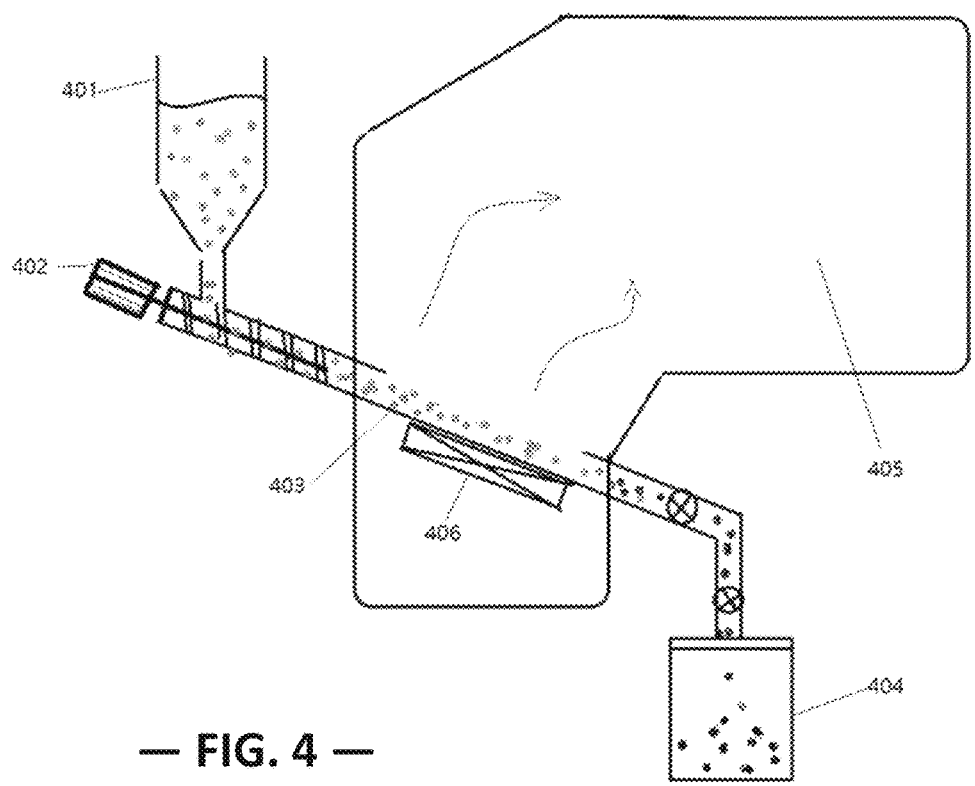
— FIG. 4 —
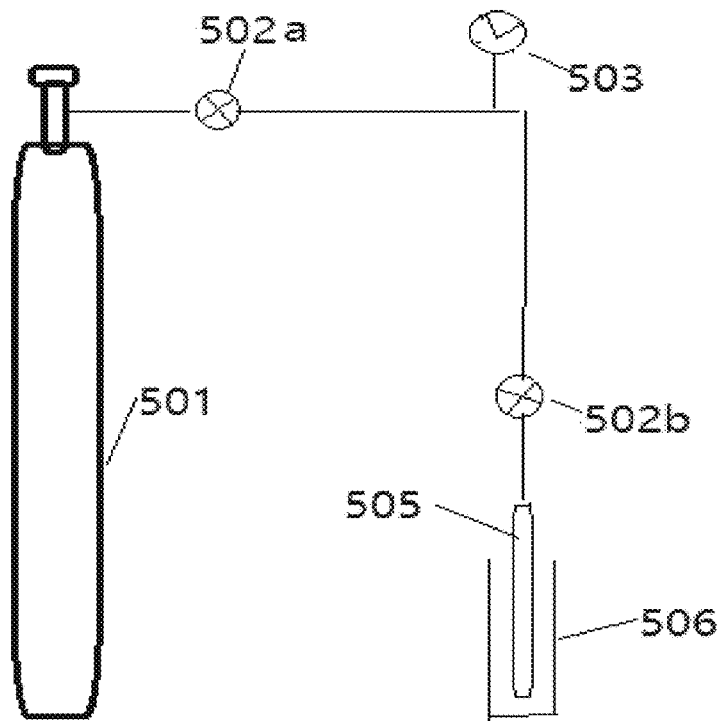
— FIG. 5 —

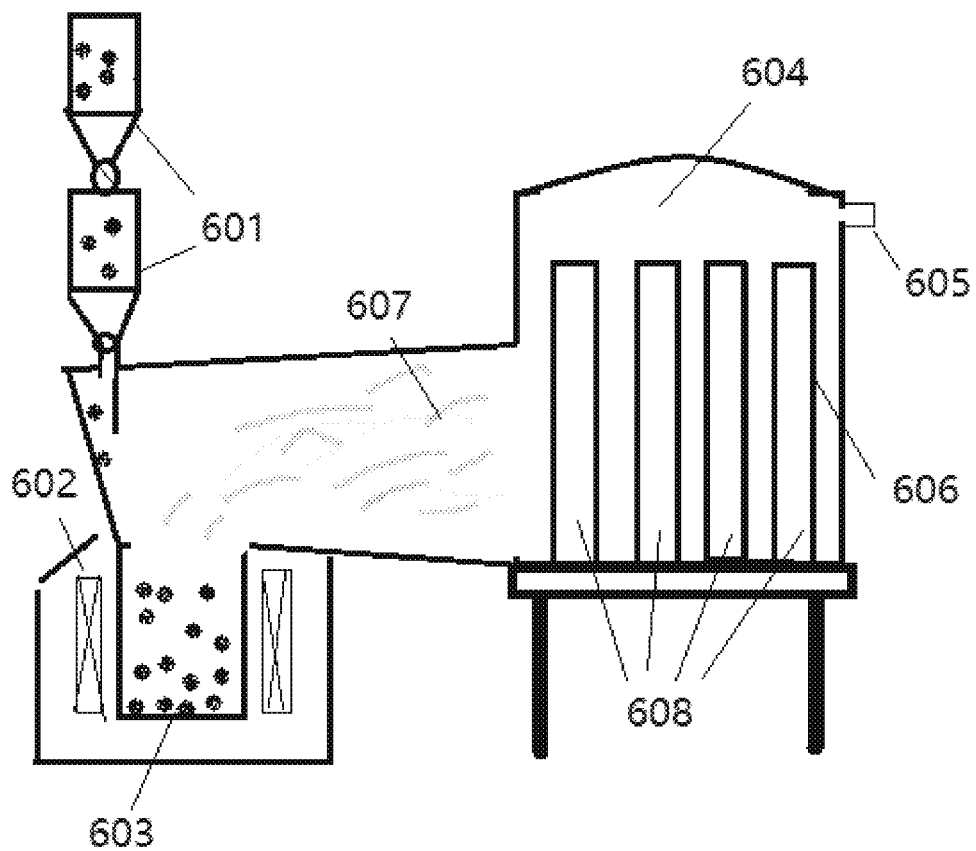
— FIG. 6 —

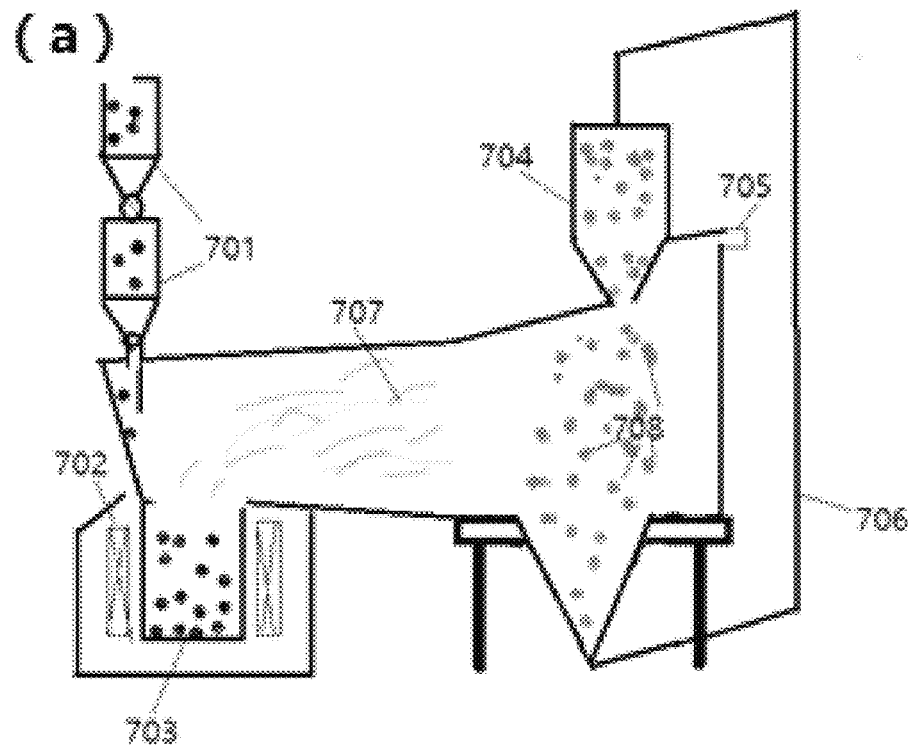
— FIG. 7A —
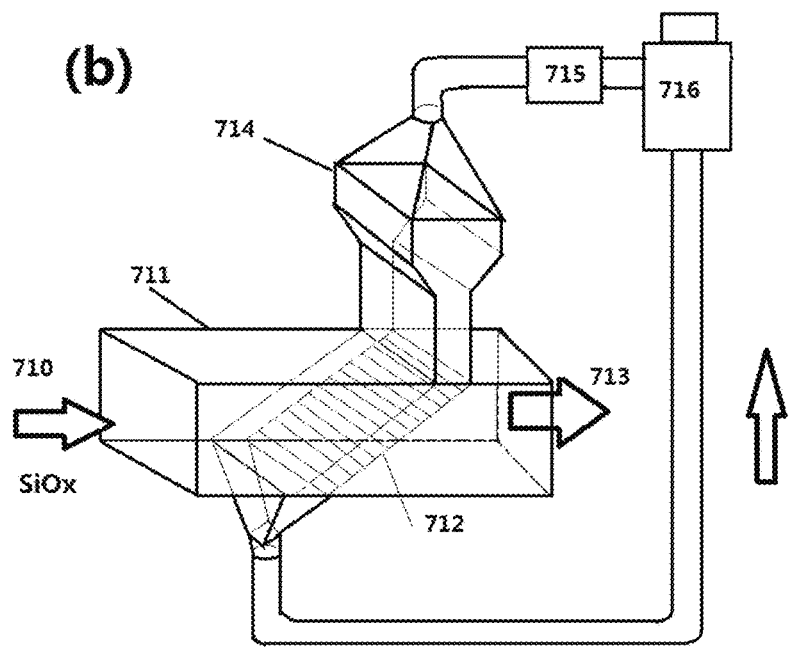
— FIG. 7B —

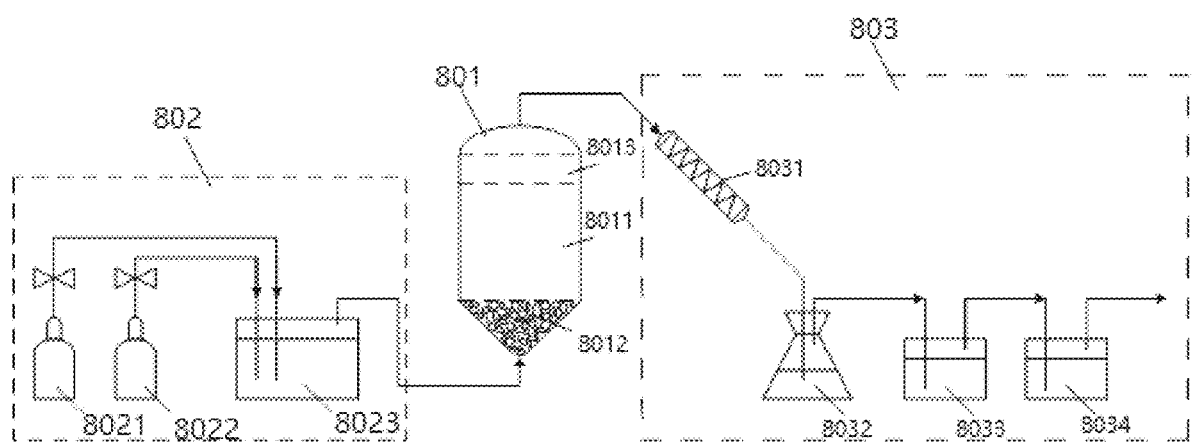
— FIG. 8 —

METHOD, APPARATUS, AND SYSTEM FOR PRODUCING SILICON-CONTAINING PRODUCT BY UTILIZING SILICON MUD BYPRODUCT OF CUTTING SILICON MATERIAL WITH DIAMOND WIRE

CROSS-REFERENCE TO RELATED APPLICATIONS

This application claims priority to U.S. patent application Ser. No. 16/499,237, now U.S. Pat. No. 11,440,805, filed Sep. 27, 2019, which is a national stage application of International Patent Application No. PCT/CN2018/080710, now WO 2018/177294, filed Mar. 27, 2018, at the Receiving Office of the Chinese Patent Office, which in turn claims priority to Chinese Patent Application No. CN201710206493.8, which was submitted to the Chinese Patent Office on Mar. 27, 2017, and which was entitled "A Method and System for Recycling Silicon by-products of Silicon Diamond Wire Cutting," and to Chinese Patent Application No. CN201710361112.3, which was submitted to the Chinese Patent Office on May 5, 2017, and which was entitled "A Reactor and Method for Producing Silicon monoxide and its application in Lithium Ion Battery Anode Material Produced Thereof." The entire contents of the Chinese Patent Applications, the International Patent Application, and the U.S. Application mentioned above are incorporated herein by reference.

TECHNICAL FIELD

The present application relates to recycling kerfs produced during the silicon diamond cutting process and, more particularly, to a method, equipment, and system for producing silicon-containing products by using a silicon sludge, which is produced by a diamond wire cutting of a silicon material.

BACKGROUND

High-purity silicon materials are drawn into single crystals and ingots and then cut into thin sheets, which can be used in semiconductor integrated circuits and solar photovoltaic cells. With the development of technology, silicon wafers are getting thinner and thinner. In particular, the thickness of silicon wafers used in solar photovoltaic cells is comparable to the diameter of diamond wires used for cutting the thin silicon sheets into silicon wafers.

In the process of silicon wafer cutting, silicon is ground into fine powder and mixed with an abrasive material on the diamond wire. The local temperature is high during cutting, resulting in a layer of silica oxide being formed on the surface of the silicon powder particle as it is being cut.

In addition to the useful silicon powder in the cutting liquid, the cutting liquid includes broken diamond, resin, or nickel-based alloys (used for fixing diamond particles on the cutting wire), as well as cutting wire base steel wire. Although these impurities are only a few thousandth of the total volume, with silica-coated silicon powder accounting for more than 99% (elemental silicon accounting for more than 85%), it is still very difficult to separate the useful part of the silicon from the waste material.

SUMMARY

The present disclosure relates to a method for recycling diamond wire cutting silicon waste, which has been separated from a liquid and which has been dried through chemical and physical reactions to form a silicon-containing product.

The method is characterized in that the drying occurs at 230° C. until no volatile gases are emitted, and the drying equipment is one of air flow drying, spray drying, fluidized bed drying, rotary flash drying, infrared drying, microwave drying, freeze drying, impact drying, countercurrent drying, superheat drying, pulsating combustion drying, and heat pump drying, or a combination thereof.

In addition, the silicon-containing product is one or more of elemental silicon, high-purity silicon, silicon alloy, silicon monoxide, halogen silane, and silicone monomer.

The chemical reaction is a disproportionation reaction between the silicon dioxide on the surface of the silicon waste particles and the elemental silicon inside it to form a silicon monoxide discharge, so that further chemical reaction and physical reaction generate elemental silicon, silicon alloy and silane and, at the same time, silicon oxide is produced. Chemical and physical reactions mean chemical reactions and physical reactions. When the disproportionation temperature is lower than the melting point of silicon, the elemental silicon is a powder. The disproportionation reaction (in which the surface oxide layer reacts with the elemental silicon in close proximity to the interior of the silicon particles, and the sub-silicon dioxide is sublimated and separated from the surface of the silicon particle) is carried out at a high temperature and in a vacuum or an inert gas at a reaction temperature of 1200-1800° C. and a reaction pressure of 0.01-0.1 Mpa.

The physical reaction is the melting aggregation of the silicon powder particles after removing the surface oxide layer or alloying with other metals. The physical reaction (in which the silicon itself is melted or alloyed with other metals) is carried out at a high temperature. The reaction temperature is 500-1800° C., and the reaction pressure is 0.001-100 MPa.

The chemical reaction further comprises a carbonylation reaction using carbon monoxide to carry out a carbonylation reaction with a transition metal in a silicon sludge to remove metal impurities. The carbonylation reaction (in which transition metal impurities in silicon react with carbon monoxide) is carried out under high temperature and high pressure. The reaction temperature is 50-240° C., and the reaction pressure is 0.01-100 MPa.

The chemical reaction further comprises the gasification reaction of the elemental silicon particles (after the surface oxide layer of the waste powder removed) with a halogen or a hydrogen halide to form a halogen silane and a silicone monomer; the halogen silane has a formula of $SiH_xL_{4-x}$, where L=fluorine, chlorine, bromine, and iodine; and x=0, 1, 2, 3, 4. The gasification reaction of silicon with hydrogen, a halogen gas (fluorine, chlorine, bromine or iodine), or a hydrogen halide gas (hydrogen fluoride, hydrogen chloride, hydrogen bromide or hydrogen iodide) is common with high temperature and high pressure and catalyst. The reaction temperature is 200-1400° C., and the reaction pressure is 0.01-100 MPa. The elemental silicon undergoes a disproportionation reaction by the silicon waste, preferably after the carbonylation reaction. Preferably, the reaction process is continuous production.

The silicon alloy refers to a multi-element alloy containing elemental silicon and at least one other metal. Examples include silicon aluminum, silicon magnesium, ferrosilicon, silicon calcium, silicon lithium, silicon germanium, silicon aluminum, and silicon titanium. The elemental silicon and the alloying element, which are produced after the disproportionation reaction, are obtained by melting. Preferably, the alloying element is added to the reactor simultaneously with the silicon waste, and the disproportionation and the melting are simultaneously performed.

The processes involved herein include one or more of electric resistance field heating, induction heating, microwave heating, direct electrode arc, electron beam, plasma heating, reaction heating, combustion heating, or a combination thereof.

The present application further provides a system for implementing the method for recycling silicon diamond wire cutting waste, in which the system includes: a drying system; a reactor feed system; a heating system; a reactor system; a silicon oxide collection system; and an elemental silicon or silicon alloy collection system.

For a reactor for carrying out a gasification reaction with a halogen, the reactor is provided with a temperature control unit. Preferably, the reactor is one of a fluidized bed, a dilute phase gas flow bed, a spouted bed, a fixed bed, or a moving bed. A hydrogen halide gas or hydrogen is fed into a reactor that is used to carry out the gasification reaction, and the reactor is provided with a temperature control unit. A halogen gas, a hydrogen halide gas, or a hydrogen gas is supplied to the intake system of the reactor, and a gasification reaction produces a gas-derived reactor and condenses the product in the collection system.

The present application also provides a method of producing silicon oxide, which uses a single precursor having both the necessary elemental silicon and silicon in different parts of a single particle for generating silicon monoxide. More specifically, silicon or incompletely oxidized silicon or silicon dioxide is further oxidized or reduced to form a single molar ratio of elemental silicon to oxygen, and then the silicon dioxide and the adjacent elemental silicon are formed into a sub-silicon oxide SiOx sublimation by a high-temperature disproportionation reaction and collected downstream. The method further uses a direct solid-state reaction to obtain a silicon monoxide solid. One of the applications of silicon oxide is as a precursor of the negative electrode material of lithium-ion batteries.

The silicon oxide component is SiOx (where x=0.1-1.9, preferably where x=0.5-1.5, or where x=0.8-1.2, or where x=0.9-1.1). The reaction temperature is from 200 to 2,800° C., preferably from 300 to 2500° C., preferably from 500 to 2,000° C., preferably from 600 to 1700° C. The reaction pressure is from 0.01 to 100 MPa; preferably, the reaction pressure is 0.11-10 MPa. Preferably, the reaction pressure is 0.1 to 11 MPa, and the reaction atmosphere is oxidized or reduced.

The synthesis conditions for silicon monoxide from the above-mentioned precursor are: reaction temperature of 200-2800° C., preferably, 500-2000° C., preferably, 600-1700° C., and reaction pressures of 0.0001-100 MPa. The reaction pressure under vacuum is 0.01-100 MPa; preferably, the pressure is <1000 Pa, preferably <100 Pa, preferably <10 Pa, preferably <1.0 Pa, <0.1 Pa. The pressure of reaction in the inert gas is 0.001-10 MPa, and preferably 0.01-10 MPa. Under high-pressure, silicon dioxide and the elemental silicon react to form a silicon monoxide solid, in which the reaction pressure is 0.1-100 MPa, and, more preferably, the reaction pressure is 1-100 MPa.

In the method and system described above, the high temperature sublimation (disproportionation reaction) forms the silicon monoxide. The process involved in the gasification and melting reaction is heated by one or more of electric resistance field heating, induction heating, microwave heating, direct electrode arc, electron beam, plasma heating, reaction heating, combustion heating, etc.

Additionally, the silicon monoxide deposition is carried out in a collection reactor, which is one of a fluidized bed, a dilute phase gas flow bed, a spouted bed, a fixed bed, a moving bed, or a combination thereof. The preferred silicon monoxide vapor is condensed and deposited on the surface of the rod, plate or particle. In certain embodiments, the preferred silicon monoxide vapor even penetrates into the interior of the lithium-ion negative electrode material particle. Preferably, the dried silicon solid powder is separated from the diamond silicon cutting waste slurry and then dried. The vapor is condensed into particulate or, more preferably, the vapor silicon monoxide is directly incorporated into the negative electrode material of the lithium-ion battery to form a silicon-containing, high-capacity negative electrode material.

The present invention also provides an apparatus for implementing the method of preparing silicon monoxide in which the apparatus includes: a silicon monoxide precursor production unit (preferably, the reactor is a fluidized bed, a dilute phase flow bed, a spouted bed, a fixed bed or a moving bed); a reactor for a disproportionation reaction to form silicon monoxide: wherein the reactor is provided with a temperature control unit to heat a crucible; and the disproportionation reaction produces a silicon monoxide vapor and collected. The collection system is one of a plate, a rod, and a bed of particles or a combination thereof in a vacuum. The plate-like or rod-like substrates in the vacuum on which the silicon monoxide is collected have a hollow structure, and a cooling medium is passed through the hollow structure to keep the temperature low for silicon monoxide condensation. For using a bed of particles in a vacuum for collecting silicon monoxide, the particles are cooled during transport to the top of the particle bed.

The present application also provides a gas-solid reactor in which there is no gas distributor on the inlet side of the reaction gas, and the gas is directly in contact with the rear surface of the solid medium. The present application also provides a method for dry recovery of metal-containing solid waste, in which the metal in the solid waste material is removed by a carbonylation reaction with carbon monoxide to form a metal carbonyl gas. The gas is then converted back into a transition metal for efficient use. The carbonylation reaction is characterized in that the reaction of the transition metal impurity with carbon monoxide is carried out in the presence of high temperature, high pressure, and a catalyst. The reaction temperature is 50-240° C., and the reaction pressure is 0.01-100 MPa.

BRIEF DESCRIPTION OF THE DRAWINGS

FIGS. 1A through 1C show the morphological structure of the dried silicon waste in the present application. Specifically, FIG. 1A is a schematic view of the composition of the silicon waste, FIG. 1B is a scanning electron micrograph, and FIG. 1C is an X-ray diffraction pattern before the reaction of the dried silicon waste in Examples 1-4.

FIGS. 2A, 2B, and 2C are process flow diagrams of specific embodiments of the present application.

FIG. 3 is a schematic view showing the structure of an equipment for recovering elemental silicon (melt to bulk) and collecting silicon monoxide by reaction of the surface oxide layer of diamond wire cut solid silicon waste particles with silicon in a specific embodiment of the present application.

FIG. 4 is a schematic structural view of an apparatus for realizing the method for recovering elemental silicon (powder) and collecting silicon monoxide by reacting the surface oxide layer of the solid silicon waste particles according to an embodiment of the present application.

FIG. 5 is a schematic diagram of a carbonylation process for removing the transition metal in diamond wire cutting silicon sludge according to a specific embodiment of the present application.

FIG. 6 is a schematic structural view of a distributor-less gas-solid deposition apparatus for realizing the generated silicon monoxide generated by bulk collection according to an embodiment of the present application.

FIG. 7A is a schematic structural view of a distributor-less gas-solid deposition apparatus for realizing the continuous collection of the generated silicon monoxide in the form of particles according to an embodiment of the present application. FIG. 7B depicts a particle reactor of the present application comprising a stepped, louver type, gas permeable baffle that conveys particles.

FIG. 8 is a schematic structural view of an apparatus for realizing the disproportionation reaction of diamond wire cutting silicon waste for the continuous production of the chlorosilanes according to a specific embodiment of the present application.

DETAILED DESCRIPTION

In view of the shortcomings of the prior art, the recycling of diamond wire cutting silicon raw material has a long process flow, complicated process, high energy consumption, and low effective utilization. In contrast, the present invention utilizes the fact that cutting of silicon material produces a thick oxide layer ($SiO_2$) on each particle (Si) surface, which can undergo a disproportionation reaction (i.e., be "disproportionated") in a vacuum or non-oxidizing atmosphere to cause the surface oxide layer to react with the elemental silicon in close proximity to it. The disproportionation reaction forms sublimation of the silicon monoxide and separates the silicon oxide from the surface of the silicon particle to achieve the purpose of removing the surface oxide layer. Therefore, it is possible to further carry out a physicochemical reaction with a metal, a halogen gas, a hydrogen halide gas, or hydrogen to further convert the silicon sludge into elemental silicon, silicon alloys, and halosilanes, thereby producing a high value-added, silicon-containing industrial product. At the same time, the present method produces more valuable silicon monoxide that can be used in many fields. The present method avoids the disadvantages that are associated with the conventional method of removing the silicon oxide layer by pickling, adding a reducing agent, etc., such as high cost, environmental pollution, and waste of silicon material.

This method does not attempt to separate and recover silicon powder from the diamond-cut silicon sludge by using different density, according to the conventional method. The present method also eliminates the two extreme misunderstandings that the silicon powder in the diamond wire-cut silicon particle is not oxidized or completely oxidized. Instead, the diamond wire-cut silicon material is directly used as a reaction raw material to prepare a silicon-containing product, which has the advantages of short process times, low energy consumption, complete constituent separation, and full raw material utilization. At the same time, the effective utilization of silicon by-products of diamond wire cutting silicon raw materials and the large-scale production of silicon monoxide are combined to realize the large-scale, high-efficiency, energy-saving, continuous and low-cost complete recycling of diamond wire-cut silicon kerfs.

The use of a carbonylation technique to remove metallic impurities in silicon sludge is also of great significance. Because in the current industrial production, a large amount of transition metals (such as Co, Ni, Cr) and other emissions are produced, mostly in the form of industrial sludge, and sometimes the transition metal penetrates into the soil to cause greater environmental damage. The treatment of such transition metal pollution has always caused environmental problems, since traditional methods mostly wash the sludge by pickling. However, the cost is high, causing secondary environmental pollution and waste of transition metals. In view of these issues, the present application utilizes the principle that some metals can be carbonylated, realizes the purpose of dry recovery of the transition metal and the effect of full utilization, and is a novel environmental treatment method, which can not only effectively recycle and convert metal-containing impurities, but also can also be used to repair soil that is contaminated by solid hazardous waste and to solve the problem of waste-caused environmental pollution in industrial emissions.

The synthesis and collection of silicon monoxide (SiOx) belongs to solid-gas-solid phase process. The traditional method starts with mixing high-purity silicon and high-purity silica ($SiO_2$) to form a precursor, then sublimating the precursor into silicon monoxide by high temperature disproportionation, and depositing SiOx downstream. The collection of SiOx is carried out in a downstream reaction vessel (tube). As the reaction time is prolonged, the inner diameter of the tube becomes smaller and smaller, the surface area of the inner wall becomes smaller and smaller, and the collection efficiency becomes lower and lower, so that the reaction has to be terminated. As a result, the overall efficiency is low. In contrast, the present application collects gaseous silicon monoxide (inhalation by a negative pressure) onto a tubular or plate-like substrate containing a hollow-pass cooling medium, or into a collecting system of a flowing granular substrate. Opposite to the conventional case, as reaction time goes on, deposition onto an outer surface causes the deposition surface area to get larger and larger, and the deposition rate to get higher and higher. When sufficient material is deposited on the substrate, the deposition reaction can be terminated (or large particles are taken out, small particles are added), and the product is removed. Continued collection afterwards, without restrictions, can achieve large-area, continuous production methods (see FIGS. 6 and 7), greatly improving production efficiency and reducing production costs.

The present application also provides a reactor apparatus/equipment/system for carrying out the method; a method for providing a unique precursor (raw material) of a silicon monoxide; equipment for collecting the above-described silicon monoxide; and an application of the equipment for silicon materials generated. The traditional method of producing silicon monoxide, using high-purity silicon and high-purity silica grinding and mixing and then disproportionation at high temperature, results in high costs, and the reaction cannot be completely carried out. Because after the particle intersections react to produce silicon monoxide, the silicon dioxide and the silicon particles are no longer in physical contact, thus no further reaction occurs.

The present application controls the oxide layer ($SiO_2$) on the surface of silicon particles (Si), which may result from the oxidation of silicon or the reduction of the silicon oxide, which is mainly to make the desired molar ratio of elemental silicon to silicon dioxide in the precursor. The silicon particles with the silicon oxide layer are disproportionated in a vacuum or inert atmosphere to react the surface oxide layer with the elemental silicon (or internal silicon dioxide and the external elemental silicon) in close proximity to one another to form silicon suboxide and to sublimate the silicon particle surfaces. This requires only one synthetic precursor (raw material) instead of using a mixture of high purity silica and silicon as in the conventional method.

It is also an object of the present application to provide a carbonylation process and apparatus for dry removal of transition metal impurities.

In industry, a large amount of transition metals (such as Co, Ni, Cr) and other emissions are produced, mostly in the form of industrial sludge. Sometimes, the transition metal penetrates into the soil to cause greater environmental damage. The treatment of such transition metal pollution has always been a challenge in protecting the environment. The present application utilizes the characteristics that such a metal can be carbonylated, and uses a carbonylation method to treat transition metals in industrial sludge, thereby achieving the purpose of dry recovery and the effect of full utilization. Thus, the present application provides a novel, environmentally friendly treatment method for removing transition metals from industrial sludge.

In order to achieve the above object, in one aspect, the present application provides a method for recycling silicon waste produced by diamond wire cutting, the method being characterized in that silicon dioxide on the surface of silicon waste particles is disproportionated with elemental silicon inside to form silicon monoxide, which can be collected.

Further, the present application provides a method for recycling solid silicon waste by recycling a diamond wire cutting liquid, the method comprising:

Step 1. Perform solid-liquid separation on the diamond wire cutting waste liquid to remove the volatile components, and obtain a dry powder, granule or block solid silicon waste. Generally, after pressure filtration, the dried silicon waste is also called silicon powder. This step is a non-essential technical feature that can be achieved by external processing.

Specifically, the waste silicon sludge has its liquid removed and is dried, so that the volatile component therein is less than 30%, preferably less than 10%, more preferably less than 1%. The semi-dry silicon powder is dried by a drying equipment, and the material in the original cutting liquid is evaporated at 230° C. to obtain a dry solid silicon waste.

Step 1a—Solid-liquid separation: The diamond-cutting waste slurry has a large recovery value mainly due to the silicon powder, which must be separated by solid-liquid separation. Using conventional methods, in order to obtain a solid, the waste slurry is subjected to solid-liquid separation, and the method of solid-liquid separation may be any feasible method of the prior art.

After the separation, there is still a certain amount of liquid in the solid, which can be cleaned. After the cleaning, the solid can be dried (as discussed below) to purify the silicon. In order to separate the silicon-containing solid, one or more of a standing method, an overflow method, and a flotation method can be employed.

In order to carry out effective solid-liquid separation, a centrifugal machine and suction filtration are used to achieve the separation effect. Liquid flotation, precision filtration, membrane separation, and/or suction filtration can be applied.

Step 1b—Drying: After the impurity removal and solid-liquid separation, the main component of the obtained solid is mainly silicon. Further drying reduces the effect of moisture on the downstream reaction. Specific methods of drying use common drying methods, such as air drying, spray drying, fluidized bed drying, rotary flash drying, infrared drying, microwave drying, freeze drying, impact drying, collision drying, superheat drying, pulsation combustion drying, heat pump drying, or the like, or a combination thereof. Drying can be done before granulation or after granulation.

Step 2. The dried solid silicon waste is heated, according to the method described in the present application, and a physical or chemical reaction is performed to produce a silicon-containing product with added value.

The dried silicon waste is directly used as the main raw material of the reaction. The silicon oxide layer on the surface of the silicon particles is disproportionated with the silicon adjacent thereto to form a sublimation of the silicon monoxide, and then the corresponding physical and chemical reaction is performed to obtain silicon-containing products, such as: elemental silicon, especially high-purity silicon; or silicon-containing alloy. Additionally, the silicon particles can be reacted with halogen gas, hydrogen halide gas, or hydrogen to form a halosilane or silane and silicone monomer, etc. The process is preferably continuous in operation.

The removal of the surface oxide layer and the production of elemental silicon and silicon alloys are mainly achieved by physical heating.

The solid silicon waste may be a solid slag directly filtered or centrifuged by a diamond wire cutting waste liquid, or may be a solid slag which is further recovered by acid washing to remove iron, using alkali to dissolve surface silicon oxide, etc. The remaining silicon waste, or a useful large-particle silicon filter cake separated by a silicon cutting solution can be produced by cyclone centrifugation or the like.

The elemental silicon and the high-purity silicon are solids containing more than 95% and 99.95% of silicon, respectively.

The silicon alloy refers to a multi-element alloy containing silicon element and at least one other metal, such as silicon aluminum, silicon magnesium, silicon aluminum magnesium, ferrosilicon, silicon calcium, silicon lithium, silicon germanium, silicon aluminum, silicon titanium, and the like.

The halogen gas is fluorine, chlorine, bromine, or iodine, and is preferably chlorine gas.

The hydrogen halide gas is hydrogen fluoride, hydrogen chloride, hydrogen bromide, or hydrogen iodide, and is preferably hydrogen chloride gas.

The term "halosilane" refers to a substance in which a hydrogen atom in a silane is partially or completely substituted by a halogen.

The silicone monomer is usually monomethylsilane or dimethylsilane.

The heating process involved is resistance heat field heating, induction heating, microwave heating, direct electrode arc heating, electron beam plasma heating, reaction heating, combustion heating mode, or a combination thereof, as long as the temperature required for the above reaction can be achieved.

The silicon suboxide has the formula SiOx (where x=0.1-1.9, or where x=0.5-1.5, or where x=0.8-1.2, or where x=0.9-1.1).

Specific Preparation Method of Each Silicon Product

1. By-Product Elemental Silicon

The dried silicon sludge contains more than 85% silicon, and the oxide layer on the surface of the silicon particles accounts for 99% of the total. In addition to useful silicon powder, there are also broken diamonds, fixed diamond particles, and nickel-based alloys on metal cutting lines, as well as cutting line base steel strands and additives in cutting fluids, with fine particles and different properties. FIGS. 1A and 1B show the morphological structure of the dried silicon waste in the present application. FIG. 1A is a schematic view of the composition of the silicon waste, and FIG. 1B and FIG. 1C are scanning electron micrographs (FIG. 1B) and X-ray diffraction patterns (FIG. 1C) before the reaction of the dried silicon waste in Examples 1-4.

For silicon powder in silicon waste, general understanding of the oxidation of the powder surface is very limited, and no effective method has been developed to quantitatively determine the degree of oxidation. One theory is that there is no oxidation on the surface of the silicon powder. Therefore, it is considered that the silicon powder can be melted or reacted with other chemicals to form a useful substance, which of course does not work. Another theory is aware of the existence of the oxide layer, so it is used in every possible way. Various chemical methods, such as pickling and alkaline washing, etch away the surface silica, which not only wastes the valuable oxide layer on the surface but also increases costs and causes waste and secondary pollution. On the other hand, due to the different shapes of the individual particles, the oxide layer is different. It is difficult to control the pickling and alkali cleaning. Excessive erosion is inevitable. Not only is the oxide layer removed but also the internal silicon is lost, which causes greater waste.

The present application considers that the silicon dioxide oxide layer on the surface of each silicon powder particle in the dry silicon waste is adjacent to the internal elemental silicon and utilizes the disproportionation reaction of silicon and silicon dioxide at a high temperature to generate silicon monoxide, which escapes the system to achieve the removal of silica on the silicon powder particle surfaces. Thus, it is possible to produce elemental silicon, silicon alloys, and halosilane organosilicon monomers downstream, while also reducing the cost and producing high value-added silicon monoxide.

During the disproportionation reaction, when the temperature reaches 1000° C., a small amount of siloxane oxide overflows. When the temperature reaches 1375° C., the disproportionation reaction is obvious. The melting point of silicon is 1410° C. The higher the temperature, the faster the reaction, but if the temperature exceeds 1702° C., the post-silicon oxide will melt.

(A) Preparation Method of Elemental Silicon

When the silicon powder is heated to a temperature above 1000° C. in a vacuum or an inert gas, the silicon dioxide wrapped on the surface of each silicon powder particle reacts with the internal silicon to form volatile silicon monoxide, which is removed until all of the silica is completely reacted. Since the silica on the surface of the silicon waste powder is less than the amount of internal elemental silicon, the silicon dioxide is completely consumed and left as elemental silicon.

For continuous production, silicon powder can be added from the bottom of the molten silicon as shown in FIG. 3A, so that the silica on the surface of the silicon powder reacts with the molten silicon to form silicon monoxide and overflows from the silicon melt, leaving the elemental silicon incorporated into the silicon melt.

If only elemental silicon fine powder is needed for the halogen chemical reaction, as shown in FIG. 3B, the disproportionation reaction temperature can be controlled below the melting point of silicon 1410° C., so that the silicon powder is directly obtained, and it is not necessary to obtain a silicon block first and then grind to form silicon powder.

(B) Preparation Method of High-Purity Silicon

For the production of high-purity silicon, it is mainly necessary to remove metal (such as nickel and iron) from the raw material silicon waste, because, in the above process, other impurities will be vaporized, and only the metal nickel and iron from the diamond wire will remain in the process. The prior art also recognizes these impurities, so that before the drying of the silica waste, complex multiple pickling methods are used to remove the metal components, which not only causes pollution but also depletes the silicon itself.

The present invention adopts a dry carbonylation method for removing metal, using nickel and iron to react with carbon monoxide at 80-120° C. and 10-100 MPa to produce a gas nickel carbonyl overflow. Nickel carbonyl can be reduced to metal nickel for regeneration, which can reduce pollution and recycle metals (such as nickel and iron) in silicon waste.

Thus, high-purity silicon can be prepared by removing the metal powder in advance (see below).

2. Preparation Method of Silicon-Containing Alloy

In the above process, depending on the silicon and silica contents in the raw silicon waste, and the composition requirements of the silicon alloys (such as silicon aluminum, silicon magnesium, ferrosilicon, silicon manganese, silicon calcium, etc.), it is necessary to first calculate how much aluminum or other metal need to be added. Such calculations are needed because, for different alloys, the ratio of silicon to metal is different, even if the same alloy, such as silicon-aluminum alloy, has a wide range of components, and the melting point of the alloy is different under different compositions, which is completely determined by the phase diagram. Thus, for example, after the silicon powder and aluminum are added to the silicon melt, the silicon dioxide reacts with a portion of the silicon to produce a silicon monoxide overflow, and the remaining silicon and aluminum form a silicon aluminum alloy liquid to be removed.

3. Removal of the Oxide Layer of Silicon Powder and Reaction with Halogen to Produce Halosilane The present invention removes the oxide layer on the surface of the silicon particles, which cannot react with a halogen gas, a hydrogen halide gas, or hydrogen, and obtains a silicon powder having an oxide layer on the surface. The exposed silicon powder further reacts with a halogen gas, a hydrogen halide gas, or hydrogen to produce halosilanes, silicone monomer, and silanes.

This approach simplifies the process by directly interfacing with the ultimate application of silicon, achieving short processes, low energy consumption, complete separation and full utilization of silicon waste. In particular, the reaction of deoxidizing the surface of silicon particles can produce polysilicon and silicone monomers with lower raw materials cost. The most common silicone monomers include monomethylsilane and dimethylsilane.

Of course, after melting and cooling silicon melt in the above process, the silicon block can also be pulverized and then reacted to form a halogen silane.

$$Si+2Cl2 \rightarrow SiCl4$$

$$Si+HCl \rightarrow SiHCl3+H2$$

$$Si+SiCl4+H2 \rightarrow 2SiHCl3+HCl$$

A halogen-containing organosilicon monomer has the formula RnSiX4-n wherein R is a hydrocarbon functional group, such as methyl, ethyl, etc.; X is F, Cl, Br, or I; and the corresponding organosilane is referred to as organofluorosilane, organochlorine silane, bromosilane, and iodosilane. The halogen gas is fluorine, chlorine, bromine, or iodine, and the hydrogen halide gas is hydrogen fluoride, hydrogen chloride, hydrogen bromide, or hydrogen iodide. With the presence of high temperature, high pressure and catalyst, the solid silicon sludge reacts quickly with halogen gas and hydrogen halide gas. Therefore, the reaction time is not limited in this application, and the overall reaction time can be based on the reaction material, the surface area, and the flow speed and can be appropriately adjusted. Usually, the produced halosilane or silane product is collected by condensation after being taken out of the reactor.

When it is observed that the condensation product is no longer increased or when the solid silicon waste is completely reacted, the reaction can be stopped.

According to the usual operating conditions of the present application, the contact residence time of the reaction gas with the solid silicon waste can be controlled to be from 0.01 sec to 1000 sec.

The conditions for controlling the gasification reaction are: a reaction temperature of 200 to 1400° C., a reaction pressure of 0.01 to 100 MPa; preferably, a reaction temperature of 300 to 1100° C., and a reaction pressure of 0.1 to 10 MPa.

More preferably, the gasification reaction is gasified in two temperature zones: first, at a low temperature of 300-350° C., and then at 500-900° C. More preferably, the low temperature reaction stage can pass a hydrogen halide gas. The high temperature reaction stage may be passed through a hydrogen halide gas and/or a halogen gas.

The catalyst comprises a metal, an alloy, and various metal compounds. Preferably, the active component of the catalyst is selected from one or more of the following: a) precious metals, in particular palladium, platinum, rhodium, ruthenium, iridium, and alloys thereof; b) transition metals, in particular nickel, copper, cobalt, iron, and alloys thereof; c) alkali metals, especially sodium, potassium, lithium, calcium and their alloys; d) rare earth metals; e) metal salts or metal oxides; and f) metal hydride.

Preferably, the active component of the catalyst is one or more of cobalt, copper, nickel chloride, copper chloride, cobalt chloride; further preferably, cobalt and/or cobalt chloride. The use of the catalyst is primarily to promote the reaction and can generally be used in an amount from 0.1% to 30% by weight based on the weight of the solid silica waste.

4. Preparation of Silicon Oxide

Silicon monoxide (SiOx) is an important electronic and optical material and is useful as a negative electrode additive for lithium-ion batteries.

Traditionally, the production of SiOx is carried out by mixing elemental silicon and silica in molar ratios and then grinding them into powders of the order of microns (the smaller the particles, the more uniform and the more intimate the mixture, and the more favorable the reaction), and then the negative disproportionation reaction is carried out under a negative pressurized environment (vacuum or inert gas) to a temperature above 1000° C. The higher the temperature, the faster the silicon oxide is formed in the form of vapor and brought to a place where the pressure and temperature are low. It is condensed into a SiO2 solid, according the reaction below (where x is not strictly equal to one):

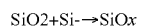

In this traditional process, first, the raw material cost is high, the grinding requires a large amount of energy, and it is difficult to uniformly mix silicon and silica. Secondly, the produced silicon monoxide is deposited in the internal wall of a downstream tube of the reactor, and, as the process proceeds, the internal diameter of the tube gets smaller and smaller, and the collection efficiency gets lower and lower due to the smaller surface area of the inner wall of the tube. Finally, the material produced should be ground into fine powder before it can be added to the lithium-ion negative carbon material in order to be practically applied. All of these processing steps cause its high cost and make it difficult to promote this technology on the market.

The present application provides a method for producing silicon monoxide, which comprises using elemental silicon and silicon dioxide to obtain a precursor by adjusting an elemental silicon and silica molar ratio close to 1:1 using an oxidation reaction or a reduction reaction under high temperature and high pressure conditions and using a disproportionation reaction of the precursor to form silicon monoxide.

Preferably, the conditions for generating silicon monoxide include: sublimating and collecting silicon monoxide.

Preferably, the conditions for generating the silicon monoxide include: reacting the precursor in a confined space at a high temperature and a high pressure to form a silicon monoxide solid.

Preferably, the silicon monoxide is formed into a silicon monoxide vapor with the adjacent elemental silicon by a high temperature disproportionation reaction to cause the oxidation. The silicon monoxide vapor is in contact with the battery anode material at a lower temperature to load the silicon monoxide on the pores and/or surface of the battery anode material.

The present application provides a method for producing a unique precursor (raw material) of a silicon monoxide material; equipment for collecting the above-described silicon monoxide material; and the use of the above equipment for collecting a silicon monoxide material. The present application utilizes the principle that silicon and silicon dioxide react to form silicon monoxide, and that directly reacting the silicon dioxide on the surface of the silicon waste particles with silicon immediately adjacent thereto produces high value-added silicon monoxide.

If only silicon monoxide is produced, this is determined by the amount of silicon in the known raw silicon powder (see Example 1). The silicon to oxygen molar ratio is close to 1:1. If there is less oxide layer on the surface of the silicon powder, the silicon powder may be oxidized for a period of time, so that the composition of the oxide layer is changed to a suitable range (so that the molar ratio is close to 1:1). Conversely, if the amount of silica is excessive, chemical reduction can be achieved to achieve a molar ratio. If the ratio is similar, and then the particles are subjected to a disproportionate reaction at high temperature (above 1000° C.), silicon monoxide should be produced, which can ensure the complete reaction of all raw materials and achieve effective utilization of raw materials.

Similarly, it is also possible to add silicon dioxide or elemental silicon to adjust a raw material silicon to oxygen molar ratio. Since silicon monoxide is overflowed as a gas phase, when it contacts the surface below the melting point temperature, it will be deposited as a solid. The composition determination of silicon monoxide and the equipment and method of collecting silicon monoxide are described in detail in the embodiment.

In the method of the present application, the raw material is subjected to oxidation, reduction or physical mixing component ratio at the time of synthesizing the precursor. The reducing agent is at least one selected from the group consisting of hydrogen, carbon monoxide, carbon, and metal; preferably, the reducing agent is carbon monoxide or carbon; and the oxidizing agent is at least one selected from the group consisting of oxygen, steam, and nitrogen oxide.

In the method of the present application, the conditions for controlling the redox reaction to prepare the silicon monoxide precursor are: reaction temperature 200-2800° C. (300-2500° C., preferably 500-2000° C., preferably 600-1500° C.). The reaction pressure is from 0.01 to 100 MPa. Preferably, the reaction temperature is from 600 to 1500° C., the reaction pressure is from 0.1 to 10 MPa.

Pure silicon reacts with oxygen in the air at room temperature to form a protective layer of silicon dioxide. However, this protective layer has only a few nanometers of protective interior which is not further oxidized. To form a thick oxide layer, it is necessary to increase the temperature and increase the oxidant pressure to accelerate the formation of the oxide layer. The material is optionally pressure molded, and the order is not limited.

The silicon monoxide precursor component formed in the present application is $SiO_x$ (where $x=0.1$-$1.9$, or preferably $x=0.5$-$1.5$, or preferably $x=0.8$-$1.2$, or preferably $x=0.9$-$1.1$).

The reaction temperature for generating silicon oxide gas from the silicon oxide precursor is 1000-2800° C., preferably 1000-2000° C., preferably 1325-1500° C., under vacuum (pressure less than 0.1 MPa) or in an inert gas (with pressure equal to 0.001-10 MPa, and preferably 0.01-0.1 MPa). A disproportionation reaction of silicon and silicon dioxide forms a sublimation gas of silicon monoxide. In the molten state of silicon, the silicon monoxide formed by disproportionation also overflows, since the silicon monoxide melting point is 1702° C. The heating method can be any direct or indirect form.

Other Operations that can be Performed During the Above Reaction (1) Optional metal removal: Metal iron and/or nickel scraps on the cutting wire are generated during the cutting process. These metal chips will enter the waste slurry. In order to obtain pure chlorosilane and a smooth reaction, these metal impurities should be removed. Iron removal prevents the formation of chlorides during the chlorination reaction, which, together with the chlorosilanes, enters the distillation system, increasing the difficulty of distillation and reducing the purity of the chlorosilanes. Similarly, if the high-purity silicon is to be produced as a by-product, the metal impurities should be removed as much as possible.

Traditional methods of metal removal include pickling and magnetic separation. The former introduces acid, and magnetic separation can achieve the purpose of removing iron. This application uses magnetic iron removal, so the impurity removal is placed at this stage of the treatment, which can reduce the formation of iron oxide during the recovery process and increase the removal rate of iron before the reaction. Since iron is oxidized during the experiment, magnetic separation can be selectively used in the present application. In order to improve the iron removal efficiency and reduce the burden of iron removal by the carbonylation method, the removal of iron is placed in the first step.

This application does not recommend pickling, but the present method can also use the silicon sludge after pickling by the manufacturer, as described above in the introduction of high-purity silicon. Because the main impurities in this application contain nickel and iron, this application uses carbonylation instead. The method comprises the steps of removing nickel and iron. The matrix method is that the dried silicon sludge reacts with carbon monoxide to form a carbonyl metal to be volatilized and removed (indicated in FIG. 2C), which belongs to the dry method to remove impurities and has less pollution, and the formed carbonyl metal can be converted further into a metal element. Advantageously, this method can also be applied to the recycling of metal-containing solid waste to solve important environmental problems. Although the principle of carbonylation has been widely applied in other fields, it has not been reported in the field of treating sewage metal that is superior to the conventional method.

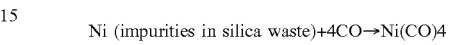

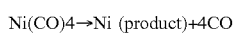

(2) Optional Press Molding

In the method of the present application, the solid material may be pulverized, ground, or granulated before the disproportionation reaction.

Specifically, it may be selected to be suitable for pulverization, grinding or granulation depending on the operational requirements of the reactor. According to a specific embodiment of the present application, in general, the pulverization may be to pulverize the solid silicon sludge to below 30 mesh, and the grinding may be to grind the solid silicon sludge to below 20 micrometers. The purpose of pulverization or grinding is to increase the surface area of the solid material, which is in contact with the gas for the reaction.

The purpose of granulation is mainly to avoid blowing off the material when the gas velocity is too high, and the silicon waste and the catalyst can be granulated separately or mixed granulation. In the case of granulation, the gas and solid materials can be appropriately increased for the residence time of the reaction to be sufficient. Forming by a pressurized method or a granulation method can be used.

Alternative addition molding includes: molding with addition of silica $SiO_2$, carbon C and a metal-containing catalyst; press molding; or granulation.

(3) Alternative Rectification

The process can include separation of different halosilanes (e.g., chlorosilanes) in the product by physical separation (depending on the boiling point).

The method of the present application also includes a process of further rectifying the produced halosilane. The specific rectification separation can be carried out according to the conventional operations in the art and will not be described in detail in the present application.

The disproportionation reaction of the present application is an exothermic reaction, and a large amount of thermal energy is generated during the reaction. As a result, the reaction temperature needs to be controlled. For example, the reactor is usually cooled down during the reaction. Thus, the coolant can utilize water or water vapor, and the heat taken out can be used for the drying of the silicon waste before the reaction. As discussed above, drying can be achieved by using a fluidized bed, a fixed bed, a moving bed, etc. to achieve the desired effect.

Steam can be used for distillation and purification of halosilanes. The compound produced in the halogenation reaction contains tetrahalosilane, trihalohydrogen silicon, and a halogen gas. This is easily purified by a distillation unit that separates the different halosilanes in the product by physical separation (due to their different boiling points) to obtain the desired quality and purity of the chlorosilane product, either for sale or as a downstream silica, polysilicon, or silicone production raw materials.

(4) Optional Addition of Material Balance Reaction

In the method of the present application, depending on the composition of the solid silicon waste, solid slag (not just the catalyst) may remain after the disproportionation reaction, and the solid slag may be incorporated into the raw material silicon sludge to be reacted in the next batch reaction. Alternatively, silica and/or carbon may be added to the raw solid silicon sludge to balance the reaction, or oxygen may be introduced to reduce the reaction remaining during or after the introduction of the halogen gas, the hydrogen halide gas, or the hydrogen gas until all the slag is reacted with less residue.

The method of adding silicon dioxide and/or carbon may be to incorporate some biomass (such as carbonized rice husk or the like) into the solid silicon waste. The silica and/or carbon may be usually incorporated in an amount of from 1% to 30% by weight based on the weight of the solid silicon sludge. In industrial production, the specific addition amount of silica and/or carbon may be previously determined by a small test according to the product requirements. The incorporated silica and/or carbon can be comminuted, ground, or granulated with the solid silica waste. The specific amount of the reducing gas to be fed can also be determined as needed, depending on the amount of the remaining solid slag.

Determination of the Exact Content of Silicon in Silicon Waste

In the process of this application, the problem of the precise content of silicon in silicon waste is also plagued by a long-term extensive process. The present application provides a method for accurately determining silicon and silicon dioxide in silicon waste. Because:

1. Since the main components in the silicon waste are silicon and oxygen, the total silicon content can only be obtained by X-ray fluorescence spectrometry or plasma spectroscopy, and the oxygen content cannot be quantitatively analyzed;
2. Although the information of silicon oxide can be obtained by using X-ray photoelectron spectroscopy (XPS), if the surface of silicon is oxidized, it is difficult to accurately analyze the content of internal silicon. In addition, XPS is a semi-quantitative analysis and cannot obtain accurate quantitative information;
3. Using the difference in density between silicon and silicon oxide, since the density of the two is close and the density data is greatly affected by the source of the sample, a reliable density value of the true state of silicon and silicon oxide in the sample cannot be obtained. There is also no operability;
4. A large number of analyses were performed on silicon and silicon oxide by full-spectrum fitting using X-ray diffraction. Since silicon oxide has an amorphous state and there are several crystal states of silicon oxide, it is unlikely that silicon oxides in different states can be analyzed;
5. Quantitative analysis of the mixture by solid nuclear magnetic method, taking into account the measurement accuracy of NMR, for semi-quantitative analysis may get better results, such as quantitative analysis, almost impossible;
6. By comparison of various means, gravimetric analysis is a better choice.

The main idea is that the high temperature in the air makes the silicon in the sample completely oxidized to silicon dioxide, and the silicon content is reversed by the increase of mass. Of course, this method has a premise that the sample does not have mass changes of other components at high temperatures. Based on the above analysis, the silicon and silica mixture samples were analyzed by thermogravimetric method and the ideal results were obtained: 85% silicon and silica on its surface constituted more than 99% of the mass.

Total Reaction Equipment

The present application also includes an apparatus for implementing the above method of recycling diamond wire silicon cutting waste, the apparatus comprising:

Drying system: drying the silicon waste powder to remove all volatile components therein;

Reactor feed system: the dried silicon waste is sent to the interior of the reactor system for reaction, preferably a continuous feed process, more preferably gas transfer or screw transfer;

Heating system: the reactor system is brought to a desired reaction temperature, and the heating used is one of resistance heating field heating, induction heating, microwave heating, direct electrode arc, electron beam, plasma heating, combustion heating, or the like;

Reactor system: a container with an inlet and outlet, carrying silicon waste, receiving heating, and continuously removing the product, which may be one of a fluidized bed, a dilute phase flow bed, a spouted bed, a fixed bed or a moving bed, or combination;

Product Collection System 1: a product collection system that collects the silicon monoxide that is excluded from the reactor system, and the disproportionation reaction produces a gas that is led to the reactor and condensed for collection. The collection system converts it from a gas phase to a solid (see detailed description below).

Product Collection System 2: a system that collects elemental silicon or silicon alloys that are excluded from the reactor system and collects them as a melt or solid phase powder.

Optionally, the apparatus further includes a carbonylation system for removing metal elements from the silicon sludge, preferably one of a fluidized bed, a dilute phase gas flow bed, a spouted bed, a fixed bed or a moving bed, or a combination thereof.

As shown in FIG. 3, the dried silicon powder (and its ingredients) is fed from a hopper 301 and injected into the melter 304 through a screw feeder 303. The smelter 304 is heated by the induction heating element 302 to melt the silicon material that has melted therein to form a melt, which produces silicon monoxide SiOx gas which is collected by the top through outlet line 305. As the silicon material is continuously added, the melt volume is increased and then flows from the upper melt outlet through line 306 into collector 307, which is protected by vacuum or inert gas.

FIG. 4 is another similar system that belongs to a moving bed operation. The dried silicon waste powder is passed through a charging equipment 401 and 402 to a heating section 403 which is open above and connected to a vacuum collection equipment 405. Different from the previous reactor, the heating temperature is lower than the melting point of silicon. When the dry powder of silicon sludge is close to reach the heating section, the oxide layer on the surface of the particle reacts with the internal elemental silicon to produce silicon monoxide from the upper part of the open section to the vacuum collection chamber 405 until all the surface oxide layers are completely reacted, and the remaining silicon powder becomes elemental silicon powder, and the elemental silicon is pushed forward to the silicon powder collection chamber 404.

The main function of the equipment is to remove the oxide layer on the surface of the silicon waste particles, making it possible to convert it into elemental silicon, silicon alloy, chlorosilanes, and by-produced silicon monoxide.

Removal of surface oxide layer of silicon particles (in common): Since silicon oxide and silicon coexist, an oxide layer is formed on the surface of each particle, and the surface oxide layer is adjacent to the internal elemental silicon, and the disproportionation reaction of silicon oxide and silicon is used to produce silicon monoxide through gas phase sublimation. The silicon monoxide re-condenses into solid state silicon monoxide at a low temperature downstream.

If the temperature at the time of disproportionation is higher than the melting point of silicon or the melting point of the alloy, the generated elemental silicon, silicon-containing alloy, and silicon monoxide are continuously discharged as shown in FIG. 3.

If the disproportionation temperature is lower than the melting point of silicon (FIG. 4), and the remaining silicon can be present in the form of a powder, it can be reacted with halogen to produce chlorosilane or silicone without pulverizing the silicon. The disproportionation reaction with a halogen gas or a hydrogen halide is carried out in the form of a powder or a granulated particle to form a halosilane, such as a tri-halogenated silane or a silicon tetrahalide, and a silicone monomer.

The reactor is used for carrying out the disproportionation reaction and, in particular, for generating the dried silicon sludge. Since the particles are extremely fine, the fine powder is not further granulated, and it is difficult to directly use the conventional reactor type to produce.

Carbonylation Unit

In the current industrial production, a large amount of waste containing transition metals such as Co, Ni, and Cr are produced, mostly in the form of industrial sludge. Sometimes, the transition metal penetrates into the soil to cause greater environmental damage. The treatment of such transition metal pollution has always been an environmental protection challenge. In response to this problem, the present application utilizes the principle that such a metal can be carbonylated and realizes the purpose of dry recovery of transition metal and the effect of full utilization. It is a novel environmental protection treatment method, which solves the environment pollution of transition metal in industrial waste and which recovers the wasted metals as resources.

Optionally, the apparatus further includes a carbonylation system for removing metallic elements from the silicon waste, the method comprising: utilizing a reactor feed system, sending the dried silicon sludge to the inside of the reactor system for reaction, preferably via a continuous feeding process, more preferably via a high pressure gas delivery or screw delivery, while adding carbon monoxide to the reactor.

The reactor system is brought to the desired reaction temperature, and the heating used is one of resistance electric field heating, induction heating, microwave heating, direct electrode arc, plasma heating, combustion heating or a combination thereof. Preferably for replacement, thermal heating is used, because the reaction temperature is low, generally less than 200° C.

The reactor system is a container with an inlet and outlet configured for carrying silicon waste, receiving heating, and continuously removing the product. The reactor system may be a fluidized bed, a dilute phase flow bed, a spouted bed, a fixed bed, or a moving bed.

The Product Collection System collects carbonyl compounds that are excluded from the reactor system, draws the reaction to produce a gas exiting the reactor, and condenses for collection.

Since the silicon powder is fine and the scale is on the order of several tens of micrometers, the general chemical reactor cannot be applied. Conventional reactors can be used after molding the powder, but metallic iron and nickel particles are difficult to completely react internally. Preferably, the reactor is a fluidized bed, a dilute phase flow bed, a spouted bed, a fixed bed, or a moving bed.

After the production of nickel carbonyl, it can also be converted into an elemental nickel in the form of fine powder or granules, which is mainly for further specific applications downstream.

Chlorosilane Production Equipment

A reactor unit that performs a gasification reaction with a halogen includes:

Reactor feed system: The silicon sludge after removing the surface oxide layer is sent to the inside of the reactor system for reaction, preferably via a continuous feeding process, more preferably via gas delivery or screw conveying. That is, solid material (solid silicon waste, and the catalyst, the solid materials may be pre-mixed and uniformly) charged into the reactor, and the gas required for the reaction is introduced into the reactor, and the halogen gas, the hydrogen halide gas or the hydrogen gas is fed into the anti-gasification reaction.

Heating system and temperature control: the reactor system is brought to the desired reaction temperature, and the heating used is one of resistance heating, induction heating, microwave heating, reaction heating, plasma heating, combustion heating, or a combination thereof.

Reactor system: with inlet and outlet, configured for carrying silicon waste, allowing halogen gas, hydrogen halide gas or hydrogen to enter into and in full contact with solid silicon waste powder, receiving heat, allowing the product to be continuously removed. It can be one of a fluidized bed, a dilute phase flow bed, a spouted bed, a fixed bed or a moving bed, or a combination thereof, preferably a gas swirling bed (a moving bed of a single-sided distributor).

Product Collection System: A product collection system collects the gas evolution reaction to remove the gas from the reactor and condense it for collection. The disproportionation reaction is carried out at a suitable temperature, and the reaction product (gaseous state) is led out to the reactor, and the liquid halosilane or silane is collected by condensation, and the reaction tail gas can be returned to the reactor for use or recovered by an alkaline solution treatment.

As shown in FIG. 8, the apparatus for realizing the method for converting the solid silicon waste separated by the diamond cutting waste slurry of the present invention into a halogen silane (the experiment is limited to chlorosilane) includes:

(1) Reactor 1 for carrying out a disproportionation reaction; the reactor is provided with a temperature control equipment (not shown). Specifically, the reactor may be an entrained flow bed, a fluidized bed, a fixed bed or a moving bed, preferably a fixed bed or an entrained bed. Since the material is fine after drying, the conventional fluidized bed reaction is difficult to control, and a large number of the reaction silicon sludge is brought downstream to cause material waste and pipe blockage, and the gas flow bed allows the material to be completely mixed with the reaction gas, greatly increasing the reaction surface.

As shown, the middle of the reactor is the main reaction zone 811 for filling the solid silicon waste; the lower part of the reactor (shown as a cone in the figure) is provided with a quartz particle filling zone 812, which can fill 3-15 mm of quartz particles, when the gas A gas distributor can be formed from the bottom to the quartz particle filling zone; a quartz wool filling zone 813 is disposed on the upper portion of the reactor, mainly for preventing the silicon waste powder from being carried out of the reactor when the gas flow is unstable. The bottom of the reactor is provided with a raw material gas inlet, and the top is provided with a product gas outlet.

(2) Feeding a halogen gas, a hydrogen halide gas or hydrogen into the intake system 2 of the reactor; the intake system 2 mainly supplies a raw material gas (halogen gas, hydrogen halide gas or hydrogen) through the bottom of the reactor with a material gas The inlet is fed into the reactor and flows from bottom to top through the main reaction zone filled with solid silicon waste, and reacts with the solid silicon waste to form a product gas (halosilane or silane); the intake system 2 shown in FIG. 8 includes gas arranged in series through the pipeline. Only two cylinders 821, 822 are schematically illustrated in the drawing for holding different gases, one of which may be an inert gas such as nitrogen for purging the reactor before the reaction. It is understood that a plurality of cylinders are set in parallel. The gas drying equipment 823 may be a zeolite-filled vessel for absorbing moisture that may be contained in the feed gas to prevent carryover of moisture into the reactor.

(3) A product collection system 3 in which the disproportionation reaction gas is taken out of the reactor and condensed for collection. The product collection system 3 mainly comprises a condenser 831, a liquid collection equipment 832, and an exhaust gas treatment equipment 833 arranged in series through a pipeline, wherein the condenser 831 is mainly used for condensing the product gas derived from the reactor 1 into a liquid. After condensation, the liquid is collected by the liquid collecting equipment 832, and the uncondensed exhaust gas (mainly unreacted halogen gas, hydrogen halide gas) is passed through an exhaust gas treatment equipment (mainly a container containing an alkaline solution, which is used to absorb unreacted halogen in the exhaust gas). In order to ensure the absorption of halogen gas or hydrogen halide gas which may exist in the exhaust gas, a plurality of exhaust gas treatment equipments may be arranged in series (e.g., two exhaust gas treatment devices 833, 834 are arranged as shown).

Silicon Monoxide Equipment

The present application also includes a method and apparatus for highly effective production of silicon monoxide, including: means for effecting the above-described recycling of diamond wire-cut silicon sludge to produce silicon monoxide and a collection method, the apparatus includes:

Reactor feed system: transporting the dried silicon monoxide precursor to the interior of the reactor system for reaction, preferably via a continuous feed process, more preferably via gas delivery or screw delivery.

Heating system: the reactor system is brought to the desired reaction temperature, and the heating used is one of the resistance heating, induction heating, microwave heating, direct electrode arc, electron beam, plasma heating, combustion heating, or a combination thereof.

Reactor system: a vessel with an inlet and outlet, configured for carrying a precursor of silicon monoxide, receiving heat, and cooling the product, which may be one of a fluidized bed, a dilute phase flow bed, a spouted bed, a fixed bed or a moving bed or a combination of them.

Product collection system: it collects the silicon monoxide that is excluded from the reactor system after the disproportionation reaction as a gas phase and that has come out of the reactor and been condensed for collection.

The collection of silicon oxide is a process from gas phase to solid phase. The traditional method of depositing silicon monoxide is carried out in the downstream tube of the reactor. As the reaction time is extended, the inner diameter of the tube becomes smaller and smaller, the surface area of the inner wall becomes smaller and smaller, and the collection efficiency becomes less and less effective. The reaction has to be terminated, and the overall efficiency is low. This application invention adopts a large-receiving area, continuous mode (see FIGS. 6 and 7), which greatly improves production efficiency and reduces production costs. Deposited on the surface of the internally cooled tube (or plate) or on the surface of the flowing particles, as time goes, the surface area is getting larger and larger, there is no limit, and the deposition efficiency is getting higher and higher.

As shown in FIG. 6, the silicon monoxide precursor is fed into the reactor and flows from bottom to top through the main reaction zone filled with the solid precursor, which is heated to form the silicon monoxide vapor into the deposition cavity, and then deposited on the plate and the hollow bar substrates. The center of the substrate can be hollow to selectively pass through a cooling medium to lower the temperature while taking heat out for drying.

To control the reaction temperature, the reactor usually needs to be cooled down during the reaction. The coolant that can be used is water or water vapor, and the heat can be used to dry the silicon waste before the reaction. The drying can be carried out in a fluidized bed, fixed bed or moving bed to achieve the desired drying effect.

As shown in FIG. 6, the powder of silicon monoxide precursor is pressed into a bulk, which is broken into particles 600 having a particle size of 3 to 10 mm. The silicon monoxide precursor particles or powder 600 are added to the reaction by a double lock hopper 601 and fall into the crucible 603. The crucible is heated to 1400° C. by the heating element 602, and the sublimated silicon monoxide 607 is introduced to the collecting chamber 604 and deposited on the surface of the tubular substrate 606 (which may also be flat or other shape). The tubular substrate 606 is a hollow interior cooled by a coolant 608, waiting for the silicon monoxide to deposit. After being deposited on the substrate, the product is removed, and then the equipment is reassembled to continue production.

FIG. 7 shows a particle deposition system apparatus in the present application. In addition to the system described above in FIG. 6, it also includes particle circulation transport as well as dispersion and collection, screening, and seed preparation systems.

As shown in FIG. 7A, the silicon monoxide precursor particles 700 are added to the reactor by the double lock hopper 701 and fall into the crucible 703. The crucible 703 is heated by the heating element 702 to above 1000° C., and the sublimated silicon oxide 707 is overflowed from the crucible 703, drifting into the collection chamber and depositing on the surface of the granular silicon monoxide substrate 708. A vacuum vent 705 has a stepped, louver type, gas permeable inclined plate on the left side (not shown, see FIG. 7B). The particles are transported from the bottom of a particle circulation unit 706 to the top of the particle circulation unit 706 and then moved to the bottom in uninterrupted cycle mode. While in the reactor chamber, the surface is kept in full contact with the silicon monoxide vapor, and the particle size continues to grow. There is also a screening equipment (not shown) between the particle circulation unit 706 and the top that leaves the large particles discharged, and the small particles are transported to the top to continue to circulate in the reactor and grow.

When there are too few small particles in the system, new smaller particle seeds can be added to ensure that the system is operating in a steady state. The system is not only suitable for all gas-to-solid phase material deposition processes, but also avoids the drawbacks of conventional methods such as clogging of the distributor in the fluidized bed, difficulty in heat handling, and limited particle size.

FIG. 7B shows a gas-distributor-less particle reactor of the present application further comprising a stepped, louver type, gas permeable baffle that functions to carry particles flowing from the top and move them down on the baffle. It does not fall as quickly as the free falling, increasing the residence time of the particles in the reactor body and increasing the deposition efficiency. At the same time, there is no limit to the particle size, as in conventional methods. For example, in a fluidized bed reactor, there is a limitation of the particle size depending on the flow velocity of the fluidized gas, and large particles generally cannot be prepared.

Reactor material: The material of the reactor needs to be able to meet the mechanical strength without causing pollution, or the inner liner can be the same or matched with the produced material without causing pollution. For example, when producing silicon monoxide, quartz, high-purity single crystal silicon, polycrystalline silicon, silicon carbide, silicon nitride, etc., the reactor material should be high-purity polycrystalline silicon, high-purity single crystal silicon, polycrystalline silicon, silicon carbide, silicon nitride, etc. To produce carbonyl nickel pellets, reactors are made of metallic nickel or stainless steel.

Gas (gas phase) distributor: All gas-solid reactions inevitable involve how to effectively pass the gas through the distributor to the solid, especially the surface of the particle. Because of this, the surface of the distributor is the surface of the substrate that is first contacted with the gas to be deposited first, so that the vent hole (spacing) of the distributor must be blocked first, and it is difficult to keep it open for a longer time. The reactor of the present application is a distributor-less gas-solid reactor, and the gas does not need to be directly contacted with the solid particles through the distributor, thereby avoiding the fatal drawback of the conventional method.

Circulation system: Any existing method such as gas delivery, vacuum loading, mechanical handling, etc. can be employed.

Thermal management: Gas-solid reaction is inevitably accompanied by a large amount of heat emission and/or absorption, and this heat occurs at the deposition interface. How to effectively manage the thermal energy of the reaction interface and how to quickly and effectively reach the temperature required for the reaction have always been the most difficult problems in the industrial application industry. In addition to the conventional heating and cooling modes described above, the present application, on the one hand, employs a hollow passage in the illustrated baffle for cooling medium to pass through to improve the efficiency of conversion of high-temperature steam to solid particles similar to that of silicon monoxide. On the other hand, in addition to conventional external preheating (cooling), a direct resistance heating baffle (as it is itself conductive) is provided for the purpose of increasing the surface temperature of the particles. Of course, if the particulate material itself is electrically conductive under the reaction conditions, it is also possible to add electric heating to the electrodes on both sides of the particle flow.

The present invention relates to a method for recycling diamond wire cutting silicon waste, which has been separated from a liquid and dried through chemical and physical reactions to form a silicon-containing product.

The method is characterized in that the drying is at 230° C. until no volatile gases come out, and the drying equipment is air flow drying, spray drying, fluidized bed drying, rotary flash drying, infrared drying, microwave drying, freeze drying, impact drying, countercurrent drying, superheat drying, pulsating combustion drying, and heat pump drying, or a combination thereof.

In addition, the silicon-containing product is one or more of elemental silicon, high-purity silicon, silicon alloy, silicon monoxide, halogen silane, and silicone monomer.

The chemical reaction is a disproportionation reaction between the silicon dioxide on the surface of the silicon waste particles and the elemental silicon inside it to form a silicon monoxide discharge, so that further chemical reaction and physical reaction generate elemental silicon, silicon alloy and silane are possible and at the same time, silicon oxide is produced. When the disproportionation temperature is lower than the melting point of silicon, the elemental silicon is a powder. The disproportionation reaction (in which the surface oxide layer reacts with the elemental silicon in which it is in close proximity to the interior, and the sub-silicon dioxide is sublimated and separated from the surface of the silicon particle) is carried out at a high temperature and in a vacuum or an inert gas at a reaction temperature of 1200-1800° C., at a reaction pressure of 0.01-0.1 Mpa.

The physical reaction is the melting aggregation of the silicon powder particles after removing the surface oxide layer or alloying with other metals. The physical reaction (in which the silicon itself is melted or alloyed with other metals) is carried out at a high temperature. The reaction temperature is 500-1800° C., and the reaction pressure is 0.001-100 Mpa.

The chemical reaction further comprises a carbonylation reaction using carbon monoxide to carry out a carbonylation reaction with a transition metal in a silicon sludge to remove metal impurities. The carbonylation reaction (in which transition metal impurities in silicon react with carbon monoxide) is carried out under high temperature and high pressure. The reaction temperature is 50-240° C., and the reaction pressure is 0.01-100 MPa.

The chemical reaction further comprises the gasification reaction of the elemental silicon particles (after the surface oxide layer of the waste powder removed) with a halogen or a hydrogen halide to form a halogen silane and a silicone monomer. The halogen silane is of the formula $SiH_xL_{(4-x)}$, where L=F, Cl, Br, or I; X=0, 1, 2, 3, or 4. The gasification reaction (of silicon with a halogen and hydrogen, where the halogen gas is fluorine, chlorine, bromine or iodine, and the hydrogen halide gas is hydrogen fluoride, hydrogen chloride, hydrogen bromide or hydrogen iodide) is commonly performed with high temperature and high pressure and catalyst. The reaction temperature is 200-1400° C., the reaction pressure is 0.01-100 MPa, and the elemental silicon is disproportionated by the silicon waste, preferably after the carbonylation reaction. The more preferable reaction process is preferably continuous production.

The silicon alloy refers to a multi-element alloy containing silicon element and at least one other metal, including silicon aluminum, silicon magnesium, ferrosilicon, silicon calcium, silicon lithium, silicon germanium, silicon aluminum, silicon titanium. The elemental silicon and the alloying element produced after the disproportionation reaction are obtained by melting. Preferably, the alloying element is added to the reactor simultaneously with the silicon waste, and the disproportionation and the melting are simultaneously performed.

The process involved therein is one of resistance electric field heating, induction heating, microwave heating, direct electrode arc, electron beam, plasma heating, reaction heating and combustion heating, or a combination thereof.

The present application further provides a system for implementing the method for recycling silicon diamond wire cutting waste, the system comprising: drying system; reactor feed system; heating system; reactor system; silicon oxide collection system; elemental silicon or silicon alloy collection system.

For a reactor for carrying out a gasification reaction with a halogen, the reactor is provided with a temperature control unit. Preferably, the reactor is a fluidized bed, a dilute phase gas flow bed, a spouted bed, a fixed bed or a moving bed; a hydrogen halide gas or hydrogen is fed into a reactor that is used to carry out the gasification reaction; and the reactor is provided with a temperature control unit.

Preferably, the reactor is a fluidized bed, a dilute phase flow bed, a spouted bed, a fixed bed or a moving bed.

A halogen gas, a hydrogen halide gas, or a hydrogen gas is supplied to the intake system of the reactor; a gasification reaction produces a gas-derived reactor; and the silicon product condenses in the collected product collection system.

The present application also provides a method of producing silicon oxide, characterized in that: step a) a single precursor having both the necessary elemental silicon and silicon in different parts of a single particle is used for generating silicon monoxide; and, following step a), step b) a direct solid-state reaction is used to obtain a silicon monoxide solid. More specifically, silicon or incompletely oxidized silicon or silicon dioxide is further oxidized or reduced to a single molar ratio of elemental silicon to silicon dioxide to form a single molar ratio of silicon to oxygen, and then the silicon dioxide and the adjacent elemental silicon are formed into a sub-silicon oxide SiOx sublimation by a high-temperature disproportionation reaction and collected downstream. One of the applications of silicon oxide is the precursor of the negative electrode material of lithium ion batteries. The silicon oxide component is SiOx (X=0.1-1.9, preferably 0.5-1.5, 0.8-1.2, 0.9-1.1). The reaction temperature is from 200 to 2,800° C., preferably from 300 to 2500° C., preferably from 500 to 2,000° C., preferably from 600 to 1700° C., and the reaction pressure is from 0.01 to 100 MPa; preferably, the reaction pressure is 0.11-10 MPa. Preferably, the reaction pressure is 0.1 to 11 MPa, and the reaction atmosphere is oxidized or reduced.

The synthesis conditions for silicon monoxide from the above-mentioned precursor are: reaction temperature 200-2800° C., preferably, 500-2000° C., preferably, 600-1700° C. Reaction pressures are between 0.0001-100 MPa.
  (a) The reaction pressure under vacuum is 0.01-100 MPa; preferably, the pressure is <1000 Pa, preferably <100 Pa, preferably <10 Pa, preferably <1.0 Pa, <0.1 Pa.
  (b) The pressure of reaction in the inert gas is 0.001-10 MPa, preferably 0.01-10 MP.
  (c) Under high-pressure silicon dioxide and the elemental silicon to form a silicon monoxide solid, the reaction pressure is 0.1-100 MPa, and more preferably the point reaction pressure is 1-100 MPa.

In the method and system described above, the high temperature sublimation (disproportionation reaction) forms the silicon monoxide, and the process involved in the gasification and melting reaction is achieved by heated using electric resistance field heating, induction heating, microwave heating, direct electrode arc, electron beam, plasma heating, reaction heating, combustion heating, etc.

Additionally, the silicon monoxide deposition is carried out in a collection reactor which is one of a fluidized bed, a dilute phase gas flow bed, a spouted bed, a fixed bed or a moving bed, or a combination thereof. The preferred silicon monoxide vapor is condensed and deposited on the surface of the rod, plate or particle, and even penetrates into the interior of the lithium-ion negative electrode material particle. Preferably, the dried silicon solid powder is separated from the diamond silicon cutting waste slurry and then dried. The vapor is condensed into particulate or, more preferably, the vapor silicon monoxide is directly incorporated into the negative electrode material of the lithium-ion battery to form a silicon-containing, high capacity negative electrode material.

The present invention also provides an apparatus for implementing the method of preparing silicon monoxide, in which the apparatus includes: a silicon monoxide precursor production unit (preferably, the reactor is a fluidized bed, a dilute phase flow bed, a spouted bed, a fixed bed or a moving bed); and a reactor for disproportionation reaction to form silicon monoxide (the reactor being provided with a temperature control unit to heat the crucible). The disproportionation reaction produces a silicon monoxide vapor, and SiOx particles are collected. The collection system is one of a plate, a rod, and a bed of particles or a combination thereof in a vacuum. The plate-like, rod-like substrates in the vacuum in which the silicon monoxide is collected have a hollow structure, and a cooling medium is passed through to keep the temperature low for silicon monoxide condensation. For using a bed of particles in a vacuum for collecting silicon monoxide, the particles are cooled during transport to the top.

The present application also provides a gas-solid reactor characterized in that there is no gas distributor on the inlet side of the reaction gas, and the gas is directly in contact with the rear surface of the solid medium. The present application also provides a method for dry recovery of metal-containing solid waste, characterized in that the metal in the solid waste material is removed by carbonylation reaction with carbon monoxide to form a metal carbonyl gas, and the gas is then converted back into a transition metal for efficient use. The carbonylation reaction (in which the transition metal impurity reacts with carbon monoxide) is carried out under the action of high temperature and high pressure and a catalyst. It is carried out under high temperature and high pressure. The reaction temperature is 50-240° C., and the reaction pressure is 0.01-100 MPa.

The Benefits Achieved by the Application
  1. Using the principle of carbonylation, in addition to effectively removing the transition metal impurities, avoiding the introduction of a large amount of acid and alkali corrosion and environmentally unfriendly chemicals, and avoiding the silicon loss during pickling, the process makes silicon waste to high purity silicon conversion possible and more advantageous with chlorosilane production.
  2. The silicon waste recovered from the diamond wire cutting liquid is directly disproportionated after separation and drying, and the method of producing elemental silicon and silicon monoxide which solve:

(a) It is possible to convert silicon waste to elemental silicon, silicon-containing alloy, chlorosilane and avoid environmental pollution when using conventional pickling silicon surface silicon oxide to obtain elemental silicon and waste of silicon during pickling.

(b) The conventional method of reacting high-purity silicon with high-purity silicon oxide has high cost and insufficient reaction, and current application achieves effectively recycling waste and low cost, and at the same time, the present application obtains high-value added silicon monoxide, and avoids environmental pollution when pickling silicon surface oxide to obtain elemental silicon and waste of silicon during pickling.

(c) For the production of silicon oxide only in the process of disproportionation, the molar ratio of elemental silicon to silicon dioxide is similar by oxidation-reduction reaction, and the equilibrium reaction of silicon oxide is used to reduce the silicon in the silicon waste as much as possible. It is completely reacted to form silicon monoxide, which achieves the purpose of recycling silicon in silicon waste to produce high-value silicon monoxide.

3. Gasification Reaction

In the conventional process of separating silicon and impurities, it is difficult to separate due to many similarities between the properties of impurities and silicon. The present application does not deliberately separate silicon Si and impurity solids, directly uses the recovered silicon waste as a raw material, use disproportionation reaction to remove the oxide layer, and directly reacts with the halogen gas, thereby saving time and labor.

The total equipment system in the process of the invention can be continuously operated as needed, and solves the problems in the prior art: intermittent operation, excessive material loss and waste; and mismatching with the actual application.

4. A method for accurately determining silicon and silicon dioxide in silicon waste, and achieving a simple method for determining silicon content in silicon waste.

5. Reaction under vacuum and non-oxygen environment, preventing the loose structure and the silicon fine powder with thick uneven surface oxide layer, which is easily oxidized further during heating.

6. Vapor deposition

The collecting equipment of the silicon monoxide is provided with a hollow tubular substrate or a granular substrate for depositing silicon monoxide, which solves the disadvantages in traditional method of depositing silicon monoxide in the downstream tube of the reactor. In the conventional method. as the reaction time is extended, the inner diameter of the tube is reduced: the smaller the diameter, the smaller the surface area of the inner wall, thus the lower the collection efficiency, and finally the reaction has to be terminated, and the overall efficiency is extremely low, while in the current application there are no such problems and the disproportionation reaction can be continuously carried out and the silicon monoxide is efficiently collected.

The present application uses a non-distributor gas-solid reactor to solve the problems of blockage, heating, pollution, particle size and the like in the conventional gas-solid reaction.

7. Directly vapor deposition of silicon monoxide vapor into the anode material of the lithium ion battery can save production cost and achieve uniform distribution.

EXAMPLES

The technical solution of the present application will be further described below with reference to the accompanying drawings and specific embodiments, which have the advantages of fewer operation steps, shorter process, cleaner separation, and favorable by-product. These examples are not intended to limit the application.

The method of the present application mainly utilizes the silicon waste obtained by solid-liquid separation and drying of diamond wire-cut silicon slurry. Among them, the operation of solid-liquid separation of the waste slurry of the diamond wire cutting can be carried out according to any feasible prior art. The resulting silicon sludge is dried to produce elemental silicon, silicon monoxide, silicon alloy, and chlorosilanes.

Example 1: Preparation and Determination of Silicon Content of Silicon Raw Materials The as-received silicon waste material, which is grayish black, mainly contains silicon powder and 10-30% liquid. Five 5 kg of the silicon waste material was placed in a quartz crucible and placed in an oven and dried at 110° C. for 24 hours until no volatile odorous gas overflowed to obtain a large piece of silicon waste. The bulk silicon waste was pulverized and repeatedly baked to 230° C. until the silicon waste had a particle size of 100 mesh or less without weight loss. Finally, 3943 g of dry silicon waste was obtained. All the silicon sludge prepared by this method was used as a raw material in all experiments thereafter.

FIG. 1B is a scanning electron micrograph, and FIG. 1C illustrates X-ray diffraction pattern of the dried silicon waste in Examples 1-4 before the reaction. It can be seen that there is no other crystalline material other than silicon, but the silicon oxide on the surface of the silicon particles is amorphous and has no diffraction peaks.

Firstly, the content of silicon and silicon oxide is quantitatively analyzed by thermogravimetry. The main idea is to completely oxidize the silicon in the sample to silicon dioxide under high temperature in air, and calculate the silicon content from increased mass. Based on the above analysis, the silicon and silica mixtures were analyzed by thermogravimetric method and the results were: 85% silicon and silica (15%) on its surface constituted more than 99% of the total mass.

The specific operation was as follows: 5 g of dried silicon waste was spread flat in a 150 mm×150 mm quartz tray and heated in a muffle furnace at 1100° C. for more than 12 hours until all the silicon powder was converted into white silica (noting that when the reaction is not complete, there is a yellowish component). The heated white silica powder was weighed and was compared with the raw material to obtain the silicon content. The following experiment gave a dynamic process in the oxidation reaction, which has a guiding effect on the actual operating temperature and time.

The experimental instrument was a DTG-60H thermogravimetric-differential thermal analyzer from Shimadzu Corporation of Japan. The experimental atmosphere was air, the flow rate was 50 mL/min, and the experimental crucible was 50 uL of open alumina crucible, and 5.0 mg of dried silicon powder was built in. First, the experimental temperature range was determined by temperature scanning. The temperature program is: the temperature increased at a 10° C./min heating rate from room temperature to 1400° C. It was found that the sample began to increase in weight at temperatures above 500° C. This process corresponds to the oxidation of elemental silicon into silicon dioxide.

During the process, the sample had a weight gain of 80.7% in the range of 520-1400° C. In order to completely oxidize the silicon in the sample to silica, it should be isothermal at 1000° C. or higher. For this purpose, an isothermal thermogravimetric experiment was performed at 1050° C. for isothermal 999 minutes. At 1050° C., the sample was weighted to 100% during the experiment, which corresponds to the process of oxidation of elemental silicon to silica. The sample before the experiment was dark brown, and the sample after the experiment turned white, indicating that all of the silicon became silicon dioxide.

Theoretically, for the Si+O2→SiO2 process, the weight gain should be 32/28*100%=114.3%. In this experiment, the weight gain is 100%, and the content of silicon corresponding to the sample should be: 100/114.3*100%=87.5%. Based on the above analysis, a quantitative analysis of a mixture of silicon and silicon oxide can be performed using a thermogravimetric method.

Example 2

2000 g of the dried silicon waste material obtained in Example 1 was placed in a 2000 ml graphite crucible, which were put it into a vacuum induction melting furnace (Shanghai Chenhua). The furnaces was evacuated to a vacuum of 10-3 torr or less, and then flushed with high-purity argon gas and heated to 1500° C. During the heating process, silicon monoxide was formed and volatilized. After the silicon was melted (as observed through a transparent window), it was cooled to room temperature, and 1400 g of crystal silicon (including the part that could not be separated inside the crucible) was obtained. Because it could not be taken out in the crucible, the weight of the crucible was increased by 30 grams. Its appearance is similar to that of polysilicon. The composition analysis is shown in Table 1. In addition, this experiment did not dock specifically to silicon monoxide collection equipment, and at the same time, some of the silicon oxide was not completely reacted. Only 5 grams of the sample was obtained from the inner wall of the vacuum melting furnace top cover. The silicon oxide content is shown in Table 2.

Example 3

As shown in FIG. 3, a 500 KW industrial melting furnace was equipped with a built-in graphite crucible of 200 liters. The top had a graphite cap. The 12-foot quartz tube was connected to a two-meter-diameter stainless steel drum with a diameter of 120 cm and then connected to a Roots blower to ensure that the stainless steel barrel had a continuous negative pressure (0.7-0.9 atm) and was externally cooled by tap water.

First, 25 kg of dry silicon powder was added to the graphite crucible (since the density of the silicon powder is lower, depending on the particle size distribution of the particles, generally 0.6-1.2 g/cc, which is much lower than the density of elemental silicon of 2.3 and the density of the melted silicon is greater than elemental silicon, up to 2.56). The induction heating element 2 equipment was started to heat up to 1500-1600° C. in 2 hours. When there is no silicon monoxide to overflow, heating was stopped, and then add 125 kg of dry silicon powder to the crucible in 5 times. Finally, approximately 45-50 liters of silicon melt is formed.

Keep the silicon melt in the crucible above 1500°, and inject silicon waste powder from the quartz tube through the bottom of the crucible through the feeder 303 (inner diameter 2-inch quartz tube). Since the feeding tube exchanges heat with the outside, when the lower temperature silicon powder is added, it is easy to solidify and cause difficulty in feeding. Therefore, the lower end of the feeding tube must be insulated, externally heated and fast fed to ensure continuous operation.

In the latter part of the experiment, the graphite crucible top cover was used to feed through the quartz tube to avoid the clogging problem. However, due to the shutdown, some silicon melt was oxidized to form silicon monoxide. Silicon powder was injected into the melter 304 (crucible) at a rate of 100-1000 g per minute until molten silicon was poured from the middle central pipe 306 into the collector 307 (quartz crucible) by about 10 liters, and 183 kg of silicon powder was added in a total of 7.0 hours. After cooling for 24 hours, the weight of the crucible was increased by 205 kg, and 34 kg of silicon was collected in the collector 307 (weighed after cooling), a total of 239 kg. The silicon content of the sample is shown in Table 1.

During the whole process, SiOx gas is discharged from the top through 305, and the system is blocked due to system blockage. In addition, this experiment did not dock specifically to a silicon monoxide collection equipment, but obtained 23 kg sample from the inner wall of the stainless steel barrel, and its silicon oxygen content is shown in Table 2.

Example 4: Elemental Silicon Powder

FIG. 4 shows another reactor of removing surface oxide layer of silicon waste powder, it is aimed to produce elemental silicon, and belongs to moving bed operation. The dried silicon waste powder is passed through a charging equipment 401 and 402 to heating section 403 which is open above the vacuum section and is connected to a vacuum collecting equipment 405 (the system is an inner diameter 20 mm T-type quartz tube, as in the heating furnace). Different from the previous reaction, the heating temperature is at 1375° C., lower than the melting point of silicon (1410° C.). When the dry powder of silicon waste approaches and reaches the heating section, the oxide layer on the surface of the particle reacts with the internal elemental silicon to produce silicon monoxide vapor, which is taken out through the tube from the upper part of the open section to the collection chamber 405 connected to the vacuum machine (0.1 bar) until all the surface oxide layers are completely reacted, and the remaining silicon powder is elemental silicon powder is continuously pushed to the collection chamber 405.

The reaction was carried out for 2 hours, 300 g of silicon powder was added, and 220 gram of silicon powder was collected (some of the partially reacted silicon powder remaining in the reactor was not recorded). 0.21 g of silicon monoxide was collected from the top (partially not completely collected on the inner wall of the vessel).

Example 5: High Purity Silicon

As shown in FIG. 5, 500 g of silicon powder after drying, the same silicon powder as in Example 2, was placed in one end of a thick-walled stainless steel tube 505 (15 kg), and the end of the tube was welded and sealed, and placed in a heating tube 506, inside the tube. The air is drawn out and the other end is connected to a carbon monoxide cylinder 501 with a pressure gauge 503 and valves 502a and 502b. First, the carbon monoxide is flushed into the tube to 10 MPa, the valve is closed, and the reactor is heated to maintain the reactor at 110° C. The pressure in the tube decreases with the reaction of nickel and carbon monoxide (the number of moles of gas decreases), due to the continuous metal nickel and iron in the dry powder of silicon waste. A carbonylation reaction with carbon monoxide.

When the pressure drops to 1.0 MPa, the valve is opened and carbon monoxide is added to the tube to return the pressure to 10 MPa and then the valve is closed. As the reaction proceeded, the pressure inside the tube was continuously reduced to 5.0 MPa and then restarted until the pressure in the reactor did not change significantly, indicating that all transition metal carbonylation reactions were completed Subsequently, the reactor is separated from the cylinder, moved to the suction cabinet, and the gas in the reactor is released to obtain a dry powder for removing metal impurities. Since the content of the metal impurities is small, the reactor is heavier, and the weight loss of the sample after carbonylation cannot be accurately determined. 493 g of treated silicon powder.

Using the same vacuum melting furnace of Example 2, 200 g of the dried and removed transition metal silicon sludge was weighed use a graphite crucible and was taken into a vacuum melting furnace, and the vacuum was first evacuated to $10^{-3}$ torr or less, then pure argon gas was introduced. At 1500° C., silicon monoxide is formed and volatilized, after all silicon is melt observed through the transparent window, the furnace was cooled down naturally, 150 g crystalline silicon (crucible weight gain) with appearance similar to polysilicon was obtained, this embodiment is used for test the effect of carbonylation for metallic impurities removal.

Table 1 compares the metal content (mg/kg) of elemental silicon and metal-removed silicon powder and high-purity silicon, using an inductively coupled plasma emission spectrometer, model: ICO2060. The comparison samples were from the National Institute of Nonferrous Metals Research. It can be seen that the removal effect of metallic nickel Ni and iron Fe is very obvious.

TABLE 1

Comparison table of metal content in silicon and high-purity silicon after elemental silicon and metal removal (mg/kg)

| Metal element | Example 2 (elemental silicon) | Example 5 (silicon powder obtained after metal removal) | Example 5 (high purity silicon) |
| --- | --- | --- | --- |
| Fe | 799.42 | 2 | 3 |
| Mn | ND | ND | ND |
| Ni | 82.505 | 3 | 2 |
| Ca | 26 | 0.5 | 1 |
| Co | ND | ND | ND |

Among them, Example 2 is the elemental silicon obtained after the disproportionation reaction, without metal removed. The disproportionation reaction means that silicon reacts with silicon dioxide. Wherein Example 5 (silicon powder obtained after removing metal) means that the metal is removed by a carbonylation reaction, but no disproportionation reaction occurs, and the disproportionation reaction means that silicon and silicon dioxide react.

Disproportionation reaction refers to reacting silicon and silicon dioxide.

Where mg/kg represents the amount of metal per kilogram of silicon waste obtained from a commercial silicon cutting plant.

Example 6

As shown in FIG. 6, using the same sample A as in Example 1, silicon oxide was coexisting with silicon, and in the case where the silicon content was known to be 87%, the microwave was heated in the air every time to make the sample 10 kg to the hot 800-1000° C., weight increase of 30-50% (when elemental silicon and silica molars are the same, silicon powder weight gains 45.7%), the degree of oxidation in the experiment is closely related to the accumulation of silicon powder, the particles should be fully in contact with oxygen in the air, which In the process of industrialization, it can be further optimized by standard chemical operation.

The obtained powder is brownish black, and the powder is pressed into a block (preventing the powder from being vacuumed out in the reaction), and is broken into a silicon oxide precursor having a particle size of 3-10 mm. The granules, silicon monoxide precursor particles or powder are added to the reactor by a double lock hopper 601 and fall into the quartz crucible 603, which is heated by the graphite heating element 602 to 1350-1400° C.

The sublimated silicon monoxide 607 overflows from the crucible drifting to the collection chamber 604 (the collection chamber 004 maintains a negative pressure) and depositing on the surface of the tubular substrate 606, the tubular 006 substrate is two pairs of inverted U-shaped stainless steel tubes of three-eighths of an inch, 40 cm high, 20 cm apart, hollow internal communication The tap water 608 is cooled, and the outlet water temperature is kept at 30° C. After waiting for the deposition of the silicon oxide on the substrate, the deposition of the outer diameter of the tube reaches 5 cm after 34 hours to terminate the deposition, the product is removed, and the weight is found to be 5.7. kg $SiO_2$. The yield is less than 30% after comparative feeding. This is because the entire deposition surface area is too small, especially when starting to deposit, large-scale production, multi-rod structure can be adopted to improve the entire deposition surface area. Accept the purpose of efficiency.

Example 7

As shown in FIG. 7A, the same sample as in Example 6 was used to prepare silicon monoxide precursor particles having a particle size of 3 to 10 mm, which were fed into the reactor by a double lock hopper 701, and dropped into crucible 703, which was heated by graphite heating element 702 to 1400° C., and the sublimated silicon monoxide 707 is floated by a helium overflow to the collection chamber and deposited on the surface of the granular silicon monoxide substrate 708. 705 is a vacuum outlet, and a shutter-type block is provided on the left side of the vacuum outlet 705. (see FIG. 7b). 706 is a particle circulator, which is transported from the bottom tank to the top of the apparatus by an in-line vacuum using 0.3 MPa argon Ar as the drive source.

In FIG. 7B, reactor chamber 711 has a silicon monoxide inlet 710 and an outlet 713, and a ladder distributor 712 is mounted inside the reactor chamber 711. The bottom of the reactor chamber 711 is connected to the vacuum loader 716 by a pipe; the top of the reactor chamber 711 is connected to the particle disperser 714, and the pipe between the step distributor 712 and the vacuum feeder 716 is provided with particle screening equipment 715.

The particles are evenly distributed by the particle disperser 714 on the step distributor 712, and then the particles move to the bottom uninterrupted cycle, and in the reactor cavity 711, the surface thereof is kept in full contact with the silicon monoxide vapor and the particle size thereof is continuously grown. Under the same conditions as in Example 6, the particles of the silicon monoxide were increased in weight to 18.3 kg, and the efficiency was remarkably improved. There is also a screening equipment 704 between the particle circulator 706 and the top to allow large particles to be discharged, and the small particles are transported to the top to continue to circulate within the reactor and grow. When there are too few small particles in the system, it can be added to ensure that the system operates in a steady state.

The composition analysis of the silicon oxide produced in Example 2-6 was carried out by the method of Example 1. Table 2 lists the oxygen to silicon ratio of the silicon monoxide SiOx prepared in each of the examples, and the method employed is the weighting method described in Example 1 of the present application. It can be seen that the silicon to oxygen ratio is very close, but when the temperature is high, the proportion of silicon is relatively high, which may be the reason for the higher vapor pressure of elemental silicon.

TABLE 2

Silicon to oxygen ratio of silicon oxide in the examples

| EXAMPLES | Condition | The value of X in SiOx Si |
|---|---|---|
| Example 2 | Vacuum Melting | 0.99 |
| Example 3 | Continuous Melting | 0.97 |
| Example 4 | Elemental silicon powder | 0.98 |
| Example 5 | High Purity Silicon Melting | 0.98 |
| Example 6, 7 | Separate production of silicon oxide | 1.02 |

Example 8

3.5 kg (calculated as elemental silicon) of the same dried silicon powder as in Example 1 was mixed with aluminum powder 10 mesh 30 kg at 10% and 90%, and added to the melter. FIG. 3 (aluminum powder cover on silicon powder), at 700° C. Under the condition of, a silicon-aluminum alloy was produced, the silicon content was 9.8%, and the silicon oxide was overflowed, and was not collected.

Example 9

The silicon powder with and without the oxide layer was compared, and the same sample as in Example 1, except that (a) was dried only, (b) was ground in a protective atmosphere (argon) for 100 minutes, and (c) was obtained from Example 4. A fixed bed reactor (see FIG. 8) is used having: a quartz tube reactor with an inner diameter of 50 mm, a tapered bottom and a central main reaction zone (heating section) of 300 mm, with a block of quartz (3-15 mm) filling cone form a gas distributor, add 30 grams of dry silicon waste powder (30-100 mesh) in the middle main reaction zone, and the upper part of the reactor is filled with quartz wool (laboratory small test uses quartz wool at the product gas outlet), to prevent the powder from being carried out of the reactor when the gas flow is unstable. The reactor product gas outlet is connected to a water condensation tube, a liquid collection bottle is connected downstream of the condensation tube, and the tail gas passage is passed through the alkali washing tank.

First, after heating in nitrogen at 250-300° C. (set temperature 270° C.), switch to gas HCl for reaction, control HCl gas flow rate to 100 ml/min, hold at 300-350° C. for 2 hours, condense collection Reactant. For the sample (a), no reaction product was collected, indicating that the silicon waste with the oxide layer did not participate in the reaction; for the sample (b), 120 and 130 g of the transparent liquid were respectively received, and the chemical analysis was that the main component was 70% SiHCl3. The remaining 29.95% is SiCl4, and other impurities are less than 0.05%. In the reactor (c), the sample silicon waste basically disappeared, indicating that most of the silicon was consumed during the reaction.

Example 10

Three samples (a), (b) and (c) which were substantially identical to the conditions of the method of Example 10, except that the reaction gas was changed from HCl to 100 ml/min Cl$_2$, and the reaction temperature was raised to 500-900° C. (setting at 700° C.), during the reaction, due to the heat of reaction, the actual temperature reached 1100° C. in the intermediate stage, and the reaction time was reduced to one hour.

Different from the implementation example 9, the sample (a) also participates in the reaction, and after the reaction temperature is raised, the surface oxide layer of the sample (a) is reacted with the internal elemental silicon to be removed, and the internal elemental silicon is exposed and participated. The reaction with chlorine. After the reaction gas after the reaction of the samples (a) and (b) was condensed, 150 g of a transparent liquid was collected, and 173 g of the sample (c) was obtained, and the chemical analysis was that the purity of the SiCl4 silicon tetrachloride was 99.5% or more.

Example 11

As in the case of Example 9, only 10% by weight of CuCl$_2$ catalyst was added to the powder, and the gasification gas feed was 100 ml/min HCl. The condensed product did not change significantly, and the reactor reaction start-up time (from heating to condensation) The time when the first drop of chlorosilane appeared in the equipment was significantly reduced, the reaction was accelerated, and the entire reaction time was only one third of that of Example 9.

The above description is only for the preferred embodiment of the present application, and is not intended to limit the present application, and various changes and modifications may be made to the present application. Any modifications, equivalent substitutions, improvements, etc. made within the spirit and principles of this application are intended to be included within the scope of the present application.

INDUSTRIAL APPLICABILITY

The present application utilizes the characteristics of a thick oxide layer (SiO$_2$) generated during diamond wire cutting on the surface of the silicon waste particle (Si), and uses it to react with inside silicon to form a silicon monoxide sublimation and to achieve the purpose of removing the surface oxide layer. Through physicochemical reaction of a metal, a halogen gas, a hydrogen halide gas or hydrogen, it is possible to further convert the silicon sludge into elemental silicon, a silicon alloy, and a halosilane, thereby producing a high value-added silicon-containing industrial product. At the same time, the present system and methods produce more valuable silicon oxides that can be used in many fields. The present system and methods eliminate disadvantages in conventional methods of removing the silicon oxide layer by pickling, adding a reducing agent, etc., which have a high cost, create environmental pollution, and waste silicon material.

What is claimed is:

1. An apparatus for manufacturing silicon oxide (SiOx), the apparatus comprising:
   a reactor system comprising a vessel having a top, a bottom, a wall extending between the top and the bottom, an inlet, and an outlet, the inlet configured to receive a precursor for making SiOx granules, the reactor system being configured to bring the precursor into reaction by heating to generate an SiOx vapor;
   a collection system comprising a particle circulation unit, the collection system being configured to maintain a temperature lower than an internal temperature of the reactor system;
   wherein the particle circulation unit is configured to circulate SiOx seeds between a high temperature zone in contact with the SiOx vapor and a lower temperature zone where the SiOx granules are cooled after deposition of the SiOx vapor on the SiOx seeds;
   wherein the collection system collects the SiOx granules transferred from the lower temperature zone after separation via screening equipment.

2. The apparatus for manufacturing SiOx according to claim 1, wherein the collection system comprises a particle bed having SiOx granules; and wherein the SiOx vapor introduced through the inlet is deposited on surfaces of the SiOx granules in the particle bed of the collection system.

3. The apparatus for manufacturing SiOx according to claim 2, wherein the collection system circulates at least portion of the SiOx granules in the particle bed to move the SiOx granules while the SiOx vapor is being introduced in contact with surface of the SiOx granules.

4. The apparatus for manufacturing SiOx according to claim 2, wherein at least a portion of the particle bed has a hollow structure cooled by a coolant, a surface of the hollow structure being in contact with the SiOx granules.

5. The apparatus for manufacturing SiOx according to claim 4, wherein the coolant is water or water vapor.

6. The apparatus for manufacturing SiOx according to claim 2, wherein the particle bed has at least one port for receiving SiOx seeds onto which SiOx vapor is deposited.

7. The apparatus for manufacturing SiOx, according to claim 2, wherein the particle bed has at least one SiOx product outlet port.

8. The apparatus for manufacturing SiOx according to claim 2, wherein the collection system cools the granules of SiOx in the particle bed by means of heat exchanging with the granules.

* * * * *